(12) United States Patent (10) Patent No.: US 12,678,714 B2
Krell et al. (45) Date of Patent: *Jul. 14, 2026

(54) PLATE ASSEMBLY AND METHOD OF MANUFACTURING FOR USE IN WATER TREATMENT

(71) Applicant: Jim Myers & Sons, Inc., Charlotte, NC (US)

(72) Inventors: Timothy E. Krell, York, SC (US); Kerry E. Dissinger, Fort Mill, SC (US)

(73) Assignee: Jim Myers & Sons, Inc., Charlotte, NC (US)

( * ) Notice: Subject to any disclaimer, the term of this patent is extended or adjusted under 35 U.S.C. 154(b) by 297 days.

This patent is subject to a terminal disclaimer.

(21) Appl. No.: 18/330,849

(22) Filed: Jun. 7, 2023

(65) Prior Publication Data

US 2024/0009596 A1 Jan. 11, 2024

Related U.S. Application Data

(63) Continuation of application No. 17/574,940, filed on Jan. 13, 2022, now Pat. No. 11,707,699, which is a
(Continued)

(51) Int. Cl.
*B01D 21/00* (2006.01)
*B01D 21/02* (2006.01)
*B01D 21/24* (2006.01)
(52) U.S. Cl.
CPC ..... *B01D 21/0045* (2013.01); *B01D 21/0003* (2013.01); *B01D 21/0069* (2013.01); *B01D 21/02* (2013.01); *B01D 21/2427* (2013.01)
(58) Field of Classification Search
CPC ............ B01D 21/0045; B01D 21/0069; B01D 21/307
See application file for complete search history.

(56) References Cited

U.S. PATENT DOCUMENTS 3,852,199 A 12/1974 Wachsmuth et al.
3,862,033 A 1/1975 Rozkydalek
(Continued)

FOREIGN PATENT DOCUMENTS

EP 0 403 590 B1 12/1989
EP 0 636 396 B1 3/1999
WO WO 89/12492 12/1989

OTHER PUBLICATIONS

Compact Settling With The Johnson Lamella Separator, http://www. nordicwater.se/Dok/nwp Is en.pdf (visited Mar. 26, 2009).
(Continued)

*Primary Examiner* — Bradley R Spies
(74) *Attorney, Agent, or Firm* — Alston & Bird LLP

(57) ABSTRACT

Various systems, apparatus, and methods used to remove solids from water are provided. A plate assembly for a plate settler assembly is provided which includes a plate body with a plate body thickness. The plate assembly also includes a first support plate attached to the plate body on a first axis extending between the first and second end of the plate body. The plate assembly may further include a second support plate attached to the plate body on a second axis extending between the first and second end. The plate assembly may also include a stiffener or a central stiffener attached to the plate body on a third axis. The plate assembly may still further include a flow control plate along the first end. The thickness of the support plates, stiffener, and flow control plate are greater than the plate body thickness. A corresponding method of manufacture is provided.

20 Claims, 12 Drawing Sheets

Related U.S. Application Data continuation of application No. 16/843,457, filed on Apr. 8, 2020, now Pat. No. 11,260,322.

(60) Provisional application No. 62/830,721, filed on Apr. 8, 2019.

(56) References Cited

U.S. PATENT DOCUMENTS

| | | | |
|---|---|---|---|
| 3,886,064 | A | 5/1975 | Kosonen |
| 4,089,782 | A | 5/1978 | Huebner |
| 4,120,796 | A | 10/1978 | Huebner |
| 4,156,644 | A | 5/1979 | Richard |
| 4,595,504 | A | 6/1986 | Hellman et al. |
| 4,597,869 | A | 7/1986 | Hakansson |
| 4,681,683 | A | 7/1987 | Lindstoi |
| 4,865,753 | A | 9/1989 | Meurer |
| 4,889,624 | A | 12/1989 | Soriente et al. |
| 4,933,524 | A | 6/1990 | Meurer |
| 5,049,278 | A | 9/1991 | Galper |
| 5,089,136 | A | 2/1992 | Cyr |
| 5,116,443 | A | 5/1992 | Meurer |
| 5,391,306 | A | 2/1995 | Meurer |
| 5,397,472 | A | 3/1995 | Bouchard |
| 5,584,993 | A | 12/1996 | Van Der Schrieck |
| 6,245,243 | B1 | 6/2001 | Meurer |
| 6,817,476 | B2 | 11/2004 | Donnick, Jr. et al. |
| 7,165,683 | B2 | 1/2007 | Boulant |
| 7,850,860 | B2 | 12/2010 | Dissinger et al. |
| 8,585,896 | B2 | 11/2013 | Roberts et al. |
| 11,260,322 | B1 | 3/2022 | Krell et al. |
| 2002/0046977 | A1 | 4/2002 | Terrien et al. |
| 2004/0031750 | A1 | 2/2004 | Larsson |
| 2008/0314823 | A1 | 12/2008 | Kulick, III et al. |
| 2012/0312741 | A1 | 12/2012 | Pashaian et al. |
| 2013/0037494 | A1 | 2/2013 | Cook et al. |
| 2019/0047884 | A1 | 2/2019 | Wiley, III |

OTHER PUBLICATIONS

FlexKlear TM Inclined Plate Settlers, FlexKlear TM Inclined Plate Settlers, http://www.glv.com/WATER/Municipal Water/Sedimentation/ FlexKlear Inclined>Plate Settlers/ProductDescription.aspx (visited Mar. 25, 2009).

Inclined Plate Separators, Siemens AG 2009, http://www.nordicwater. se/Dok/nwpIsen.pdf (visited Mar. 26, 2009).

Inclined Plate Separators, Siemens AG 2009, http://www.water. siemens.com/en/products/separation clarification/plate clarifiers/ Pages/Zimpro Inclined Plate Separators.aspx (visited Mar. 26, 2009).

Inclined Plate Settlers, WesTech, Inc., http://www.westech-inc.com/ public/brochures/InclinePlatel.pdf (visited Mar. 26, 2009).

IPS/// Inclined Plate Settlers, WesTech, Inc., http://vvww.westech-inc.com/product.cfin?ItemID=79&Cat=6 (visited Mar. 26, 2009).

Lamella Gravity Settler—Inclined Plate Settler, Parkson Corporation, http://www.parkson.com/parksonassets/brochures/lamella.pdf (visited Mar. 26, 2009).

Meurer Research, Inc.—Plate Settlers, http://www.meurerresearch. com/plates.html (visited Mar. 25, 2009).

Racine Uses Siemens Technologies Inclined Plate Separators to Clarify Drinking Water, Siemens AG 2009, http://www.water.siemens. com/en/applications/drinking watertreatment/Pages/zimproacmecs. aspx (visited Mar. 26, 2009).

Siemens Water Technologies Inclined Plate Separators Remove Solids at Atlanta-Fulton County, Siemens AG 2009, http://www. water.siemens.com/en/applications/drinking watertreatment/Pages/ zimproatlantafultoncs.aspx (visited Mar. 26, 2009).

The Lamella Gravity Settler Has Consistently Produced Results in Over 4,000 Installations Since 1971, Parkson Corporation, http:// www.parkson.corn/Content.aspx?ntopicid=49&parent=industrial &processID=70&offeringID=67 (visited Mar. 26, 2009).

420A

600A

405

610A

620A

405

600B

420B

610B

620B

PLATE ASSEMBLY AND METHOD OF MANUFACTURING FOR USE IN WATER TREATMENT

CROSS-REFERENCE TO RELATED APPLICATIONS

This application is a continuation of U.S. application Ser. No. 17/574,940, filed Jan. 13, 2022, which is a continuation of U.S. application Ser. No. 16/843,457, filed Apr. 8, 2020, which claims the benefit of U.S. Provisional Application No. 62/830,721, filed Apr. 8, 2019, the contents of all of which are incorporated herein by reference in their entirety.

TECHNOLOGICAL FIELD

Example embodiments of the present disclosure relate generally to a plate assembly, a plate settler assembly, and associated methods of manufacturing and using said plate assembly and plate settler assembly for separating solids from water.

BACKGROUND OF THE INVENTION

Clarifiers may be used to remove solids from a fluid suspension such as, for example, during the treatment of water. The removal of the solids occurs through sedimentation where the water is allowed to pass through large basins or tanks, commonly referred to as "clarifiers."

A lamella clarifier or "plate settler" is a type of clarifier having a series of mutually parallel plates disposed therein. Each plate defines a settling surface that is structured in contact with a water flow. As the flow travels upward between the parallel plates along their respective settling surfaces, the heavier solids begin to collect on the settling surfaces and, thus, are removed from the lighter water flow.

Applicant has identified a number of deficiencies and problems associated with the manufacture, use, and maintenance of conventional water clarifiers. Through applied effort, ingenuity, and innovation, Applicant has solved many of these identified problems by developing a solution that is embodied by the present invention, which is described in detail below.

BRIEF SUMMARY

In an example embodiment, a plate assembly is provided for a plate settler. The plate assembly includes a plate body defining a first end and a second end. The plate body includes a first surface and a second surface each extending between the first end and the second end. The plate body defines a plate body thickness between the first surface and the second surface. The plate assembly also includes a first support plate attached to the plate body on a first axis extending between the first end and the second end. The first support plate is configured to support the plate body along at least a direction of the first axis. The first support plate defines a first support plate thickness. The first support plate thickness is greater than the plate body thickness.

In some embodiments, the plate assembly also includes a second support plate attached to the plate body on a second axis extending between the first end and the second end. In such an embodiment, the second support plate is configured to support the plate body along at least a direction of the second axis and the second support plate defines a second support plate thickness greater than the plate body thickness. In some embodiments, the first axis is parallel to the second axis.

In some embodiments, the plate body further defines a first lateral edge and a second lateral edge each extending between the first end and the second end. In such an embodiment, the first support plate is attached to the plate body along the first lateral edge, and the second support plate is attached to the plate body along the second lateral edge. In some embodiments, the first support plate is attached to the second surface of the plate body along the first lateral edge. In such an embodiment, the second support plate is attached to the second surface of the plate body along the second lateral edge.

In some embodiments, the first support plate comprises a first leg and a second leg defining a first intersection therebetween. In such an embodiment, the first intersection is disposed on the first axis, the first leg includes an attachment surface configured to attach to the plate body, and the first leg is angled relative to the second leg. In some embodiments, the first support plate includes a third leg and a second intersection between the second leg and the third leg. In such an embodiment, the third leg is angled relative to the second leg, and the first leg, the second leg, and the third leg of the first support plate are configured to define a C-shaped channel.

In some embodiments, the plate body defines a first lateral edge and a second lateral edge each extending between the first end and the second end. The plate assembly further includes a stiffener attached to the plate body on a third axis extending between the first lateral edge and the second lateral edge. In such an embodiment, the stiffener is configured to support the plate body along at least a direction of the third axis, the stiffener defines a stiffener thickness, and the stiffener thickness is greater than the plate body thickness. In some embodiments, the stiffener thickness is greater than the first support plate thickness. In some embodiments, the first axis is perpendicular to the third axis.

In some embodiments, the stiffener includes a first stiffener leg and a second stiffener leg defining a stiffener intersection therebetween. The stiffener intersection is disposed on the third axis and the first stiffener leg is disposed at an angle to the second stiffener leg. In some embodiments, the plate assembly includes a flow control plate extending from and structurally supporting the first end of the plate body. The flow control plate defines a first lateral flow encouraging surface and a second lateral flow encouraging surface.

In some embodiments, the plate body and the first support plate are each made from sheet metal. In such an embodiment, the plate body is made from 26 gauge stainless steel sheet metal. In some embodiments, the plate assembly further includes a welded joint between the plate body and the first support plate. In some embodiments, the plate body defines a first lateral edge and a second lateral edge each extending between the first end and the second end. The plate body defines a width of 54.5 inches between the first lateral edge and the second lateral edge.

In some embodiments, the plate body defines a first lateral edge and a second lateral edge each extending between the first end and the second end. In such an embodiment, the plate assembly further includes a central stiffener attached to the plate body on a third axis extending between the first lateral edge and the second lateral edge. The stiffener is configured to support the plate body along at least a direction of the third axis, wherein the stiffener defines a central stiffener thickness and the central stiffener thickness is greater than the plate body thickness.

In an example embodiment, a method of manufacturing a plate assembly is provided. The method includes defining a first end and a second end of a plate body. The plate body includes a first surface and a second surface each extending between the first end and the second end. The plate body defines a plate body thickness between the first surface and the second surface. The method also includes attaching a first support plate to the plate body on a first axis extending between the first end and the second end. The first support plate is configured to support the plate body along at least a direction of the first axis, wherein the first support plate defines a first support plate thickness and the first support plate thickness is greater than the plate body thickness.

In some embodiments, the method also includes attaching a second support plate to the plate body on a second axis extending between the first end and the second end. The second support plate is configured to support the plate body along at least a direction of the second axis, the second support plate defines a second support plate thickness, and the second support plate thickness is greater than the plate body thickness. In some embodiments, the first axis is parallel to the second axis. In some embodiments, the plate body further defines a first lateral edge and a second lateral edge each extending between the first end and the second end. The first support plate is attached to the plate body along the first lateral edge and the second support plate is attached to the plate body along the second lateral edge. In some embodiments, the first support plate is attached to the second surface of the plate body along the first lateral edge. In some embodiments, the second support plate is attached to the second surface of the plate body along the second lateral edge.

In some embodiments, the first support plate includes a first leg and a second leg defining a first intersection therebetween. The first intersection is disposed on the first axis, the first leg comprises an attachment surface configured to attach to the plate body, and the first leg is angled relative to the second leg. In such an embodiment, the first support plate includes a third leg and a second intersection between the second leg and the third leg; the third leg is angled relative to the second leg; and the first leg, the second leg, and the third leg of the first support plate are configured to define a C-shaped channel.

In some embodiments, the plate body defines a first lateral edge and a second lateral edge each extending between the first end and the second end. The plate assembly further includes attaching a stiffener to the plate body on a third axis extending between the first lateral edge and the second lateral edge. The stiffener is configured to support the plate body along at least a direction of the third axis, wherein the stiffener defines a stiffener thickness and the stiffener thickness is greater than the plate body thickness. In some embodiments, the stiffener thickness is greater than the first support plate thickness. In some embodiments, the first axis is perpendicular to the third axis.

In some embodiments, the stiffener includes a first stiffener leg and a second stiffener leg defining a stiffener intersection therebetween. The stiffener intersection is disposed on the third axis and the first stiffener leg is disposed at an angle to the second stiffener leg.

In some embodiments, the method also includes attaching a flow control plate extending from and structurally supporting the first end of the plate body. In such an embodiment, the flow control plate defines a first lateral flow encouraging surface and a second lateral flow encouraging surface. In some embodiments, the plate body and the first support plate are each made from sheet metal. In such an embodiment, the plate body is made from 26 gauge stainless steel sheet metal.

In some embodiments, the method also includes welding a joint between the plate body and the first support plate. In some embodiments, the plate body defines a first lateral edge and a second lateral edge each extending between the first end and the second end and the plate body defines a width of 54.5 inches between the first lateral edge and the second lateral edge.

In some embodiments, the plate body defines a first lateral edge and a second lateral edge each extending between the first end and the second end. In such embodiments, the method of manufacturing a plate assembly also includes attaching a central stiffener to the plate body on a third axis extending between the first lateral edge and the second lateral edge. In such an embodiment, the central stiffener is configured to support the plate body along at least a direction of the third axis, wherein the central stiffener defines a central stiffener thickness and the central stiffener thickness is greater than the plate body thickness.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 10A:
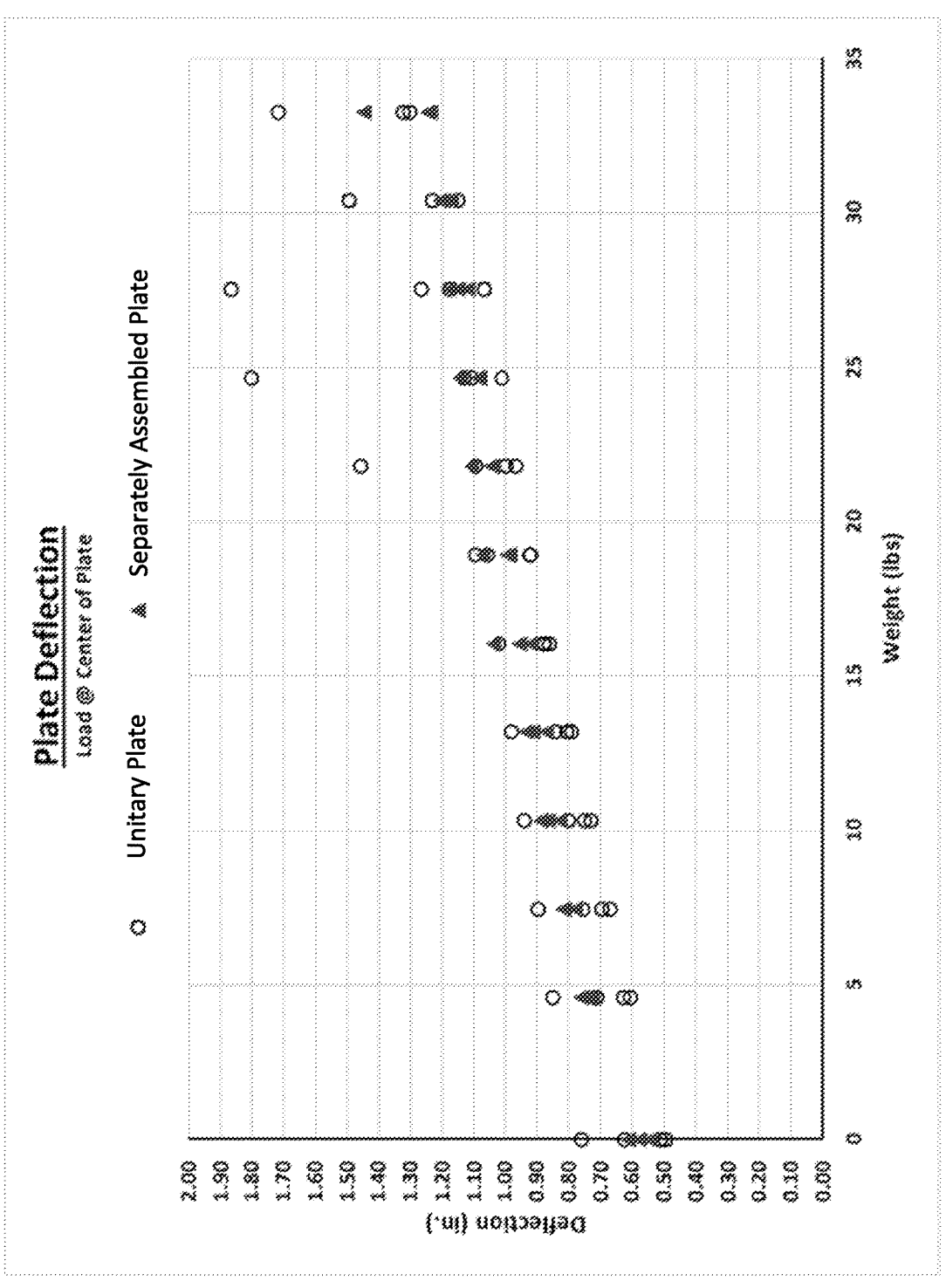
Figure 10B:
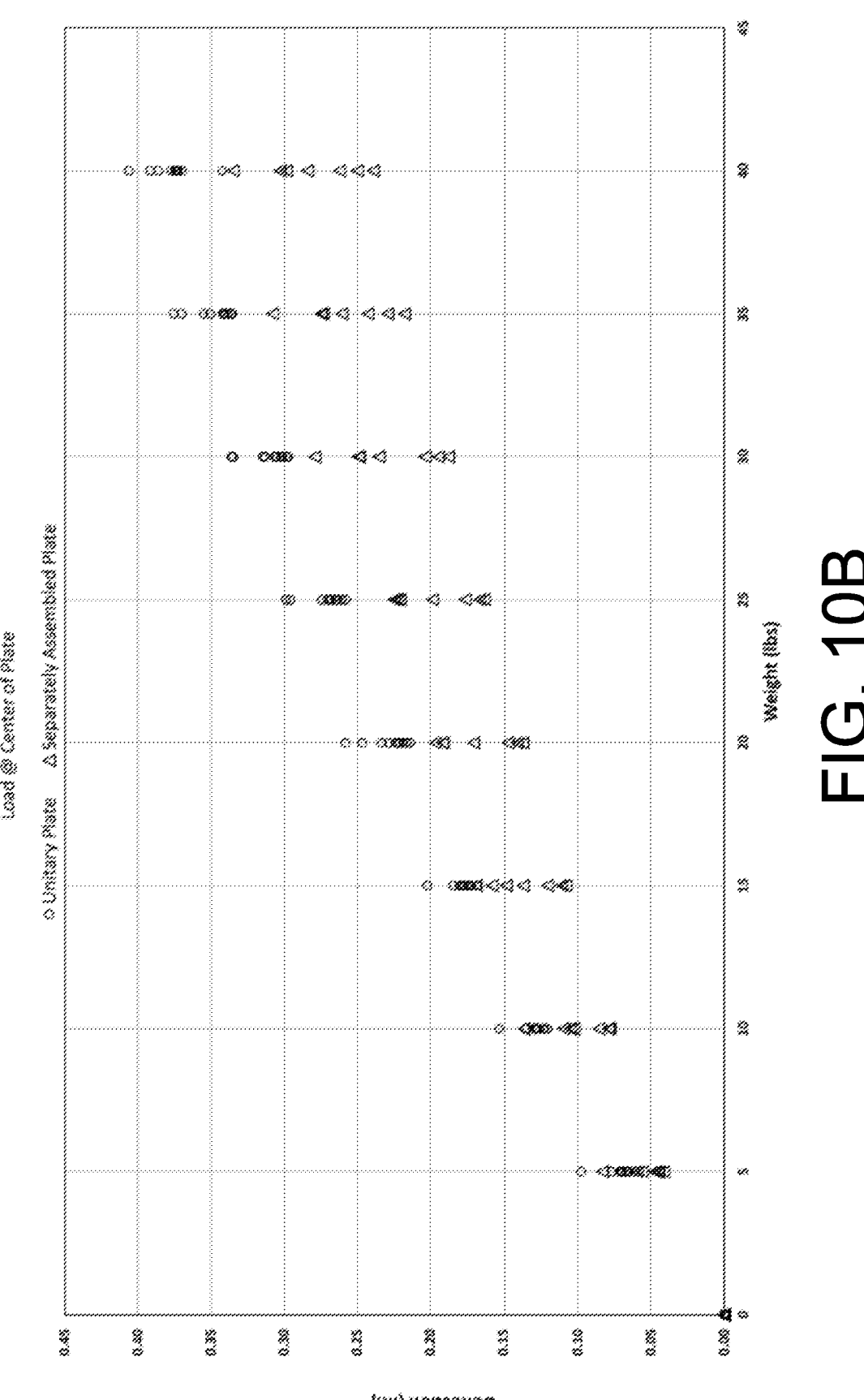

FIG. 10A is a graph showing the amount of deflection observed when various weights are placed on the center of plate assemblies in accordance with an example embodiment of the present disclosure compared to unitary plate assemblies; and FIG. 10B is another graph showing the amount of deflection observed when various weights are placed on the center of plate assemblies in accordance with an example embodiment of the present disclosure compared to unitary plate assemblies.

DETAILED DESCRIPTION OF THE INVENTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the term "along" means near or on, but not necessarily requiring directly on, an edge. Additionally, the term "attachment surface" means the actual part of the plate body to which the support plates, stiffener, and/or flow control plate are attached. Further, the term "angled" refers to an angle between zero and 180 degrees. Thus, use of any such terms should not be taken to limit the spirit and scope of embodiments of the present disclosure.

Figure 4:
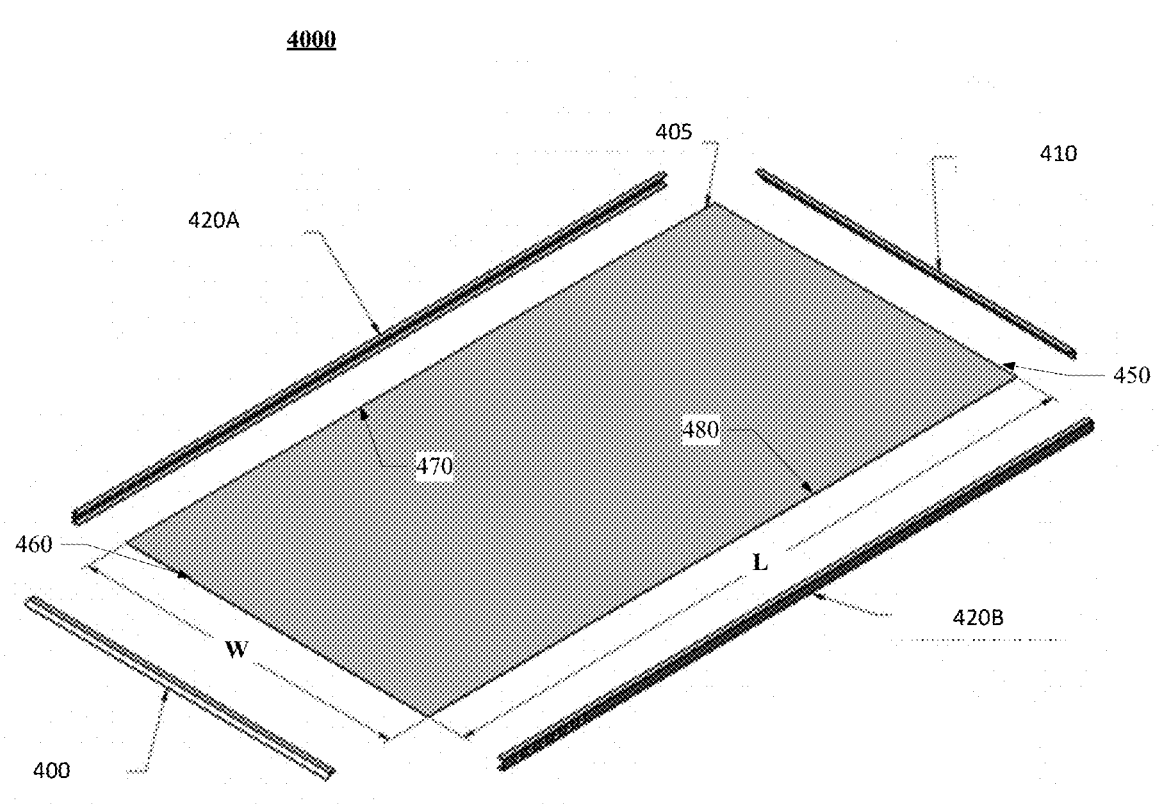
FIG. 4 is an exploded perspective view of a plate settler assembly structured in accordance with one embodiment of the present disclosure.

A plate settler assembly may include a series of mutually parallel plate assemblies disposed therein. The plate assemblies may include a plate body on which solids in water may sediment and one or more frame components for structural support and/or controlling fluid flow. With reference to FIG. 4, each plate assembly may comprise a plate body 405, which forms the primary settling surface, and at least one support plate 420 disposed along a lateral edge of the plate body.

Figure 1:
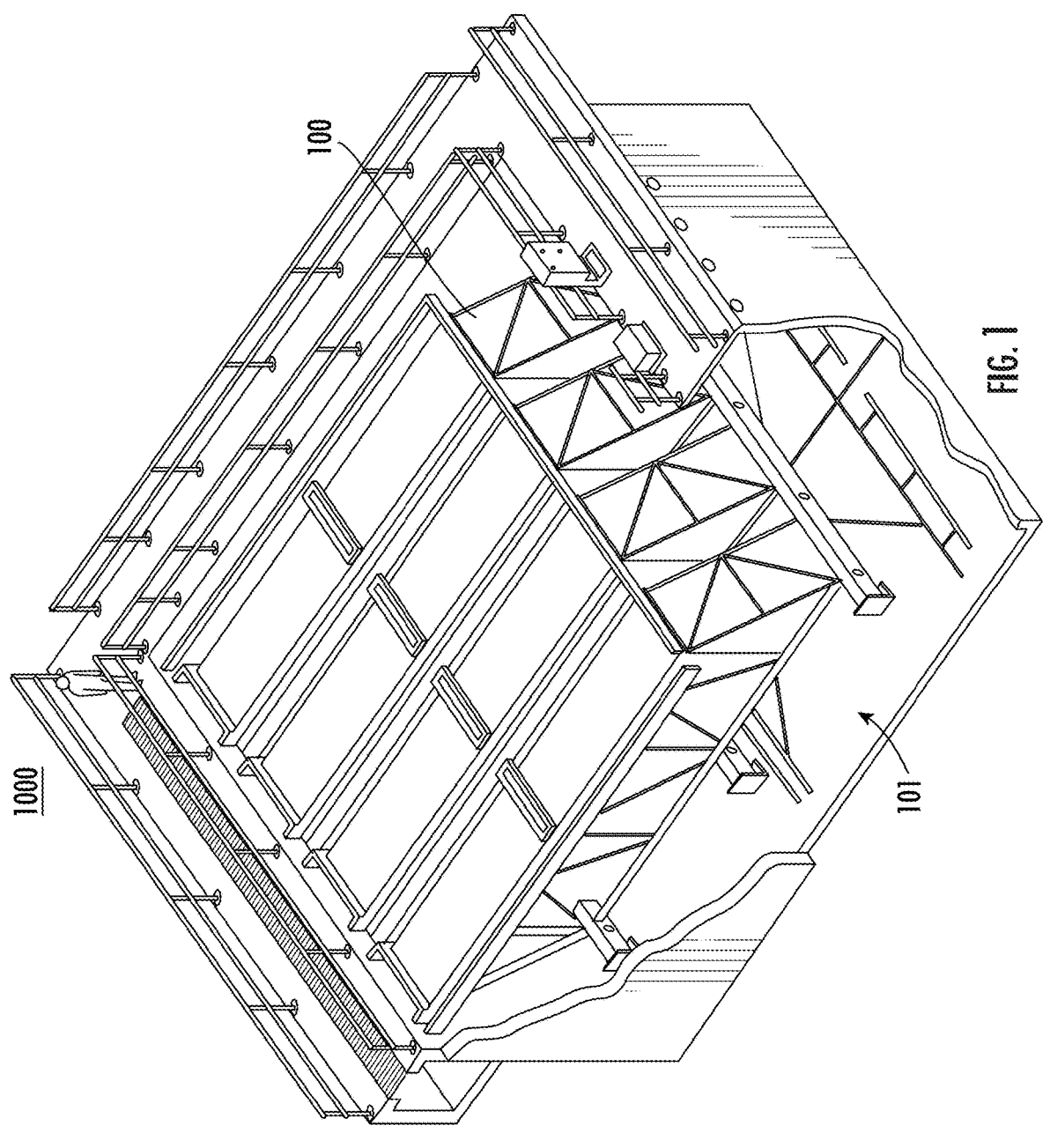
FIG. 1 is a perspective view of a system of plate settler assemblies, such as embodied as a water treatment plant, according to an example embodiment of the present disclosure.

A plate settler assembly (e.g., plate settler assembly 100 shown in FIG. 2) may comprise a plurality of plate assemblies forming a plurality of mutually parallel channels through which fluid can flow. With reference to FIG. 1, multiple plate settler assemblies may be combined to form a plate settler system in one or more clarifier basins 101. The channels of the plate settler assembly may be defined between plate bodies of adjacent plate assemblies, and may be laterally bounded by the at least one support plate. As described herein, plate assemblies may be manufactured individually and then placed together into each plate settler assembly. The plate settler assembly may then be placed into a system of plate settler assemblies in a basin of a water treatment facility in order to increase the capacity of the systems. During operation, liquid needing treatment may be passed through the channels defined by the separation of the plates. As the liquid flows through the plate settler assembly, solids in the water settle onto the adjacent plate body below and move along the incline of the plate body to the bottom of the plate settler assembly, while the liquid moves upward. The sedimentation may then fall to the bottom of the clarifier basin for collection (e.g., via suction or other removal means).

It was originally believed that the most efficient and effective way to produce a plate settler was by forming the settling plates out of a single piece of folded steel (e.g., each component of a plate integrally formed by folding a single sheet). Folding a single sheet is thought by the industry to be the most cost effective process as a unitary structure reduces the number of steps required during manufacturing (e.g., all folding done by one folding machine). It was believed the benefits of using one singular piece of material allowed for a stronger composite plate assembly and therefore a stronger plate settler assembly with a minimal number of construction steps. In addition to believing that attaching side channels would create a weaker assembly structure, it was originally believed that it would be more costly and/or more time consuming to attach support features to the plate body described herein than have them formed integrally with the plate body. In this construction method, both the loading from the additional plates and the free-span solids loading are used to determine the minimum allowable material that can be used for plate construction. Since the plate body and side channels are formed from one piece of material, the thickness of the plate body and the perpendicular sides are the same with the highest load amount on the plate assembly dictating the required thickness.

Co-owned U.S. Pat. No. 7,850,860, which patent is incorporated by reference herein in its entirety, discloses a plate settler that includes "end plates" or "flanges" folded onto lateral edges of a "plate" for support. Although the '860 patent discloses alternative embodiments in which the end plates comprise separate pieces, the inventors did not ascribe any benefit to this alternative embodiment or any variation or improvement upon the structure of the plates and connected pieces that might improve the performance of these alternative embodiments over the disclosed primary embodiments. The inventors of the present application have discovered that the structure and cost effectiveness of a plate settler assembly may be unexpectedly improved via the specific improvements and structural variations disclosed herein, and these improvements unexpectedly exceed the prevailing thought of those in the industry.

Conventional knowledge discounted and did not consider a separate design because the prevailing thought was that a plate assembly as described and claimed herein would increase the cost of labor and manufacturing time over a unitary plate assembly due to increasing the number of steps required to manufacture one plate assembly. Those skilled in the sheet-metal arts had long maintained that unitary, folded devices are stronger and more cost-effective than separately assembled elements. However, the separate manufacturing of an example embodiment allows for a reduction in labor and manufacturing cost by eliminating the use of a large folding machine, as is required in a unitary plate assembly, which would require 3 to 4 minutes per plate and multiple manual operators to maintain, and instead may use, for example, an automated spot welder that completes the welding process in about 30 seconds. For example, folding a large plate body, such as those described herein, with the precise construction desired in a cost effective way may be difficult due to the sheer size of plate assemblies and the large tolerances in plate folding machinery. Plate bodies with integral support plate(s) as described herein would require folding of the plate body to form the support plates. The type of folding used to create integral plate assemblies, typically done using a foot operated machine that requires manual handling of the large, unwieldy plates, are often not precise to a desired level, are time consuming to handle and bend, and require high manpower as multiple personnel may be required to effectively fold them. Moreover, it was believed that the resulting structure of the present disclosure would produce moderately weaker plates than a unitary design. In the process of developing the present inventions, the inventors discovered both that a unitary design was unexpectedly inefficient to manufacture and that the presently-claimed devices were unexpectedly stronger and more cost effective. The plate assembly as described herein, while requiring more steps during the manufacturing process (e.g., each component is individually formed before being attached to the plate body), unexpectedly reduces both the manufacturing time and cost, in addition to reducing the reliance on an imprecise folding method described above, while also improving or maintaining the strength of the plate assemblies. For example, an example embodiment of the present disclosure made from stainless steel using a 26 gauge plate body, two 24 gauge support plates, a 14 gauge flow control plate, and a 16 gauge bottom stiffener resulted in a reduction in total cost of 15.3% (with a materials cost reduction of 16.3% and labor cost reduction of 6.3%) and a weight reduction of 21.8% over the unitary plate design using 26 gauge with a 14 gauge flow control plate.

The present disclosure provides various systems, apparatus, and methods used to remove solids from water. For example, in some embodiments, a plate settler may be used to settle solids from wastewater in a wastewater treatment facility. Plate settler assemblies may include a plurality of individual plate assemblies attached, directly or indirectly, to a frame to effectively remove solids from water (e.g., the solids are suspended in the water). In some examples, singular plate settler assemblies may be disposed in a clarifier basin, such as the basin 101 shown in FIG. 1, and water may be passed along the plate settler assemblies to remove and collect the solids at the bottom of the basin. The plate settler assemblies provide a large combined surface area within a relatively small total volume via which solids may settle out of solution and be collected within the basin.

Due to the amount of plate assemblies in a plate settler assembly and their typical size, the materials cost of each plate body makes up a significant proportion of the overall cost of the plate settler assembly. For example, the materials cost of the plate body is generally 60% to 80% of the total materials cost. Another expensive portion of a plate settler assembly is the material handling costs associated with shaping and forming each plate and the added transportation costs associated with shipping a completed structure. As discussed above, it was initially believed that the plate settler structures should be formed from a single piece of material where possible, such as the plates made according to the disclosure of the '860 patent. Consistent with the current understanding in the industry, it was initially believed that separately manufacturing the components of the plate assembly would be less efficient, more expensive, and more time consuming than folding the plate as a unitary member. However, as discussed above, the separate manufacturing process proved faster due to the time consuming nature of folding the large plates and improvements in spot welding technology. Folding a piece of material as large as a plate settler plate requires costly manufacturing equipment and risks producing larger-than-acceptable variance between plates if not folded precisely, which is increased due to the requirement that humans need to manually handle the sheets during the folding process. Separating the manufacturing of the components (e.g., each component being configured independently before attachment), in addition to improvements in automated spot welding, allowed for an overall reduction in time and labor cost to manufacture the separated plate assembly over the unitary plate assembly.

Due to the size of the typical, unitary plate design, off-site manufacturing is required, coupled with the related shipping costs due to the size and shape of the combined plate body and side channels. Some embodiments of the present, separate plate assembly allows for, but does not require, a portion of the manufacturing of plate assemblies to be completed on-site (e.g., either the location the plate assemblies are to be installed or nearby). For example, a company may ship an automated welding machine required for the manufacturing of an example embodiment of a plate assembly close to the final destination of the plate assemblies and the cost related to the on-site manufacturing would be offset by the reduction in shipping costs. In such an example, the individual components may still be formed before being shipped (e.g., the folding of each component may be completed off-site and then the individual components may be shipped separately before being welded together). Alternatively, the manufacturing of the plate assembly may continue to be performed off-site and the cost of manufacturing will still be reduced as detailed throughout and the cost of shipping may be reduced since the separately assembled plate assembly allows for a reduction in weight without a reduction in strength over the current, unitary version. Therefore, embodiments discussed herein according to the present disclosure allow for a novel plate assembly for a plate settler that includes a planar plate body with supporting structure(s) separately attached thereto to have a reduction in material, an increase in strength, more efficient structure, more cost-effective manufacturing, more precise manufacturing, more efficient transportation, and on-site manufacturing.

In some embodiments, the plate assembly may have a plate body and at least one support plate formed separately and attached thereto for supporting the plate body. The plate body may form the primary settling surface for the solids in the water and may be the largest individual component of each plate assembly. The plate body may be defined as a flat piece of material, such as stainless steel. Folding, especially manual folding on the scale necessary for the plate body, may be slow and costly. In some embodiments, attaching separate support plate(s) to the plate body may eliminate the need to fold the plate body or handle the relatively large size of the body, which may allow for more cost effective manufacturing, more precise manufacturing, more cost effective transportation, and a more resilient structure during transportation and use. In various embodiments, the final welding of the plate assemblies and assembly of the plate settler assemblies may be performed on-site, which may reduce the shipping cost for a project. The freight cost of transporting an assembled plate settler assembly can exceed several hundred thousand dollars, whereas transporting the components (either as individual pieces or smaller subassemblies) may allow for more compact and efficient shipping (e.g., individual components can be shipped individually), resulting in a reduction in transportation cost.

In some embodiments, plate settler assemblies made according to the structures and methods disclosed herein may show a decrease in cost and materials used because the plate body 405 may be thinner and can have a different thickness than the support plate(s) 420. An example embodiment allows for the surface area of a plate body to remain the same as current plate assemblies with a reduction in materials required. For example, the plate body with a standard width of 54.5 inches and a standard length of 117 inches may be made out of thinner material resulting in a 25% reduction in stainless steel. In some embodiments, such as shown in FIG. 4, the plate assembly 4000 may include one or more of a stiffener 400, a central supplemental stiffener 510, or a flow control plate 410 also attached to the plate body. A stiffener, for example, may provide support for the plate body along a different axis from the support plate(s) (e.g., along a bottom edge of the plate in the case of a bottom stiffener 400). Previously, it was believed that reducing the overall materials used (e.g., the thickness of the plate body being reduced) would reduce the strength of the plate assembly. However, the resulting separately assembled plate assembly is stronger than a similarly dimensioned unitary plate design (e.g., a plate body and supports folded from a single piece of sheet metal) in addition to being cheaper than the unitary plate design. The current industry belief is that making a plate assembly out of one piece (e.g., an integrally formed plate body and support plate(s) at a minimum) provided for a stronger, more cost effective, and better plate assembly. Indeed, numerous specifications published by customers seeking plate settlers require a minimum of 24 gauge plates on the mistaken assumption that this is the thinnest possible material that can be used to retain sufficient structural rigidity; however, embodiments according to the present invention, as discussed herein, permit plate bodies of less than 24 gauge (e.g., 26 gauge) to be used without reducing the strength of the plate assembly and, in some instances, actually increasing the strength of the plate assembly. For example, plate assemblies according to the embodiments discussed herein may support 30 lb solids loading evenly distributed over the plate, and may withstand a 15 lb point load on the bottom edge without failing, buckling, yielding, or creating a permanent deformation. In such embodiments, once the 15 lb load is removed, the plate may exhibit limited hysteresis.

In some embodiments of the present disclosure, support plate(s) 420 are made from separate pieces of material from the plate body 405, which may be folded separately and subsequently attached to the body. The inventors have discovered that having separately attached support structures (e.g., flow control plates, support plate(s) and/or stiffener) allows the support plate 420 to use a different thickness than the plate body 405. The support plate 420 may have a higher thickness than the plate body in some embodiments, which may allow the plate body 405 to be made from a thinner material than would have otherwise been possible in an integral plate settler assembly, while retaining a greater strength than the thinner material would lead one to believe. In some embodiments, a stiffener 400 may be attached to one end of the plate body to provide further structural support. In this manner, the support plate(s) 420 and/or stiffener 400 may be used to strengthen the plate body 405 under loads. Because the plate body 405 makes up a significant portion of the mass of the plate assembly, the inventors also discovered that a thinner plate body 405 resulted in an overall stronger plate assembly 4000, in part, due to a non-negligible reduction in weight. Additionally, the small surface area of the support plate(s) 420 relative to the plate body allows for a reduction in material costs even when the support plate(s) 420 have a greater thickness than the plate body 405 and, in some embodiments, when the support plate(s) 420 have a greater thickness than an integral support plate would be (e.g., a support plate may be 22 gauge or 24 gauge, while the plate body may be 26 gauge in embodiments of the present disclosure, while a unitary plate may be entirely made of 24 gauge steel). Since steel is often sold by the square foot, the cost of the plate assembly can be determined by square foot (Width by Length) multiplied by the cost of the material per square foot. Generally, the cost per square foot increases as the thickness increases. An example embodiment of the present disclosure allows for a reduction in the thickness of the plate body and therefore a reduction in price. For example, an example 54.5 inches by 117 inches plate assembly using the separate plate assembly design reduces the material cost by about 15% over the unitary plate assembly.

As discussed in more detail below in reference to FIGS. 9A-10B, this reduction in material comes without weakening the system, and may actually strengthen the plate assembly 4000 relative to a unitary embodiment. The decrease in thickness of materials used for the plate body 405 reduces the overall amount of material used, even with an increase in thickness for the support plates 420 and the increase of the stiffener 400 (e.g., using 26 gauge steel instead of 24 gauge steel for a plate body may allow for a 25% reduction in weight). Generally, the thickness of the support plate(s) 420 and stiffener 400 (if applicable) may be inversely proportional to the thickness of the plate body 405 (e.g., as the thickness of the plate body decreases, the thickness of one or more of the support plate(s) 420 and/or stiffener 400 may be increased as discussed herein).

The support plate(s) 420 and the plate body 405 may, in some instances, be manufactured off-site and shipped to the location of a use independently of one another. In such cases, once both the support plates and the plate bodies are on-site, they may be attached using welding, riveting, or the like. In some cases, the support plates may be attached off-site.

In addition to the reduction in manufacturing time and cost for the separately assembly plate assembly design, the flexibility allowed by the embodiments disclosed herein allows for a streamlining of the manufacturing process. For example, manual handling is often required to position a sheet as large as the plate body 405 (e.g., an example plate body used for a unitary design has a 54.5 inches width (W) by 117 inches length (L) and is made out of 22 to 24 gauge steel) in a sheet metal folding tool. This manual handling (or even automatic variants of manual handling) introduces significant manufacturing cost, significant safety concerns, and significant precision issues because of the scale of the work piece. Said differently, handling and folding a large sheet of stainless steel may introduce a margin of error into the dimensions of the plate body 405 and/or support plate(s) 420. The inventors have discovered that using a flat plate body with separately attached components avoids many of the handling and precision issues of an integral plate assembly, by instead attaching smaller pieces that require less sophisticated equipment (e.g., punch/press machines may be used instead of complex folding machines) to manufacture to the plate body, which may be conducted more safely, economically, precisely due to the tolerances and costs of operating such machines.

Figure 2:
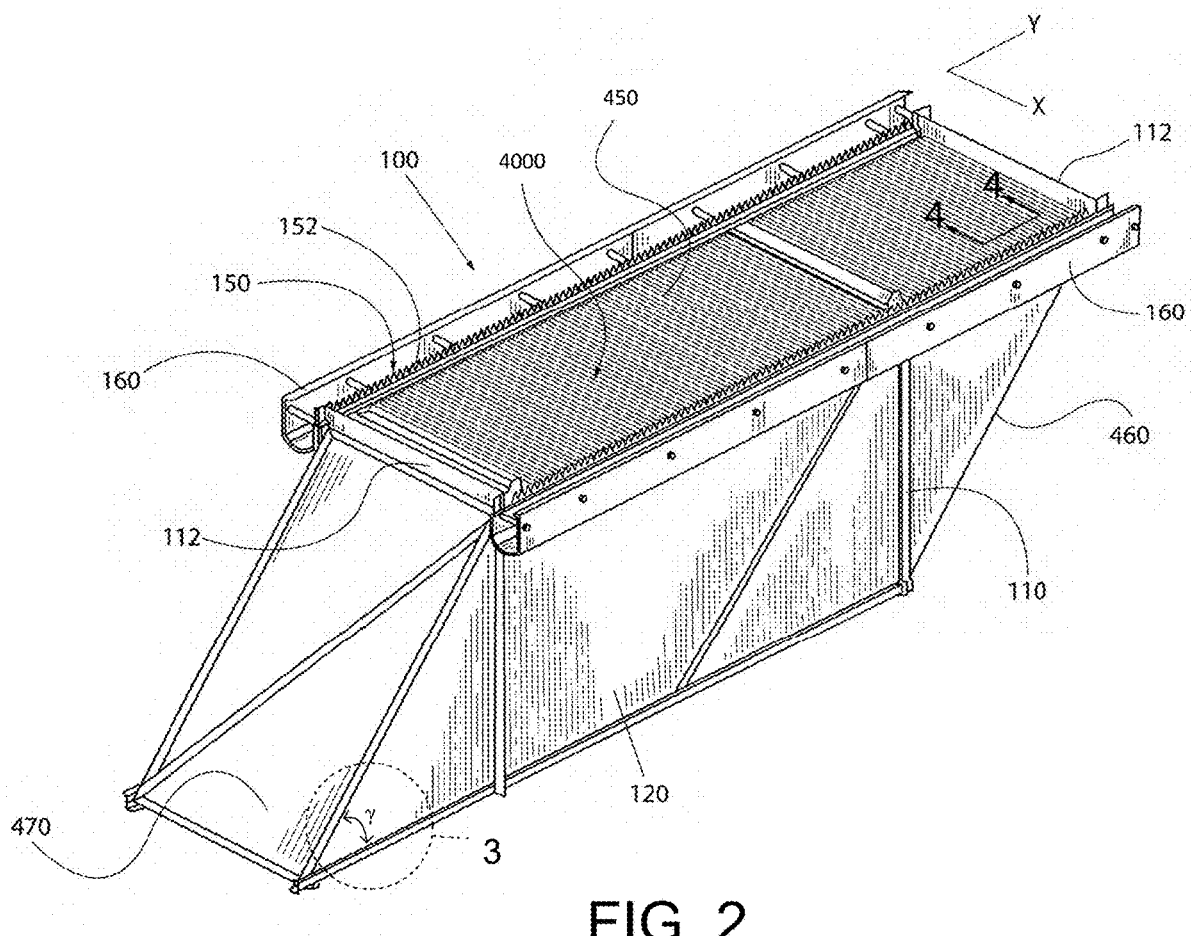
FIG. 2 is a perspective view of a plate settler assembly incorporating a plurality of plate assemblies structured in accordance with various embodiments of the present disclosure.

With reference to FIG. 1, the plate assembly 4000 described in various embodiments herein, may be used in combination with other plate assemblies, either of similar and/or different construction, to create a plate settler assembly 100. The plate settler assembly 100 may be used either alone as a plate settler assembly, such as shown in FIG. 2, or with other similar plate settler assemblies together in a sedimentary basin 101 of a water treatment facility 1000, such as shown in FIG. 1. For example, the embodiment shown in FIG. 1 uses four parallel plate settler assemblies, each comprising a plurality of plate assemblies held within a frame (e.g., frame 110 shown in FIG. 2). In an example embodiment, with reference to FIG. 3, water with suspended solids is introduced through the inlet holes 125 of the support plates 420 and through the bottom of the plate body 405. During operation, water travels upwards through the inter-plate channel between two plate bodies, said channel may be bounded by the one or more support plates of one of the plate assemblies on one or both lateral sides of the channel. As the water travels upward, the solids within the water may separate onto the adjacent plate body below. The plate bodies are angled relative to horizontal (e.g., such as angle γ shown in FIG. 2) to allow the solids settled on the adjacent plate body to move downward until they fall into the bottom of the basin for collection. The water may be run through multiple plate assemblies in order to remove all possible solids. Additionally, the number of plate settler assemblies used in a water treatment plant 1000 may be based on the amount of water that needs to be separated (e.g., more plate settlers allow more water to be separated in a given amount of time).

Plate Assembly Structure

Figure 5:
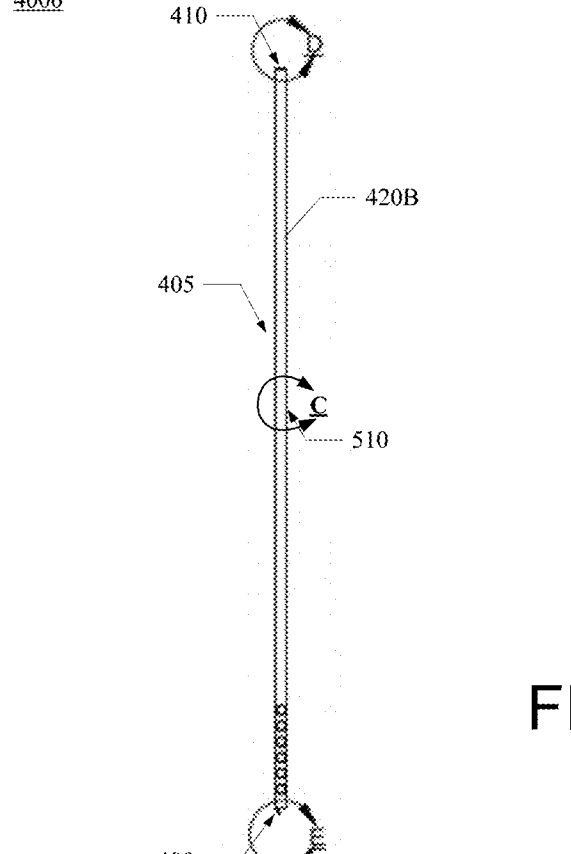
FIG. 5 is a side view of a plate settler assembly structured in accordance with an example embodiment of the present disclosure.

Example embodiments of the plate assembly 4000 may be structured and arranged in various ways according to the various embodiments disclosed herein. With reference to FIGS. 4-5, for example, the plate assembly 4000 may include a plate body 405 and at least one support plate 420. In some embodiments, support plates 420 may be disposed along opposite lateral edges 470, 480 of the plate body 405. In some embodiments, at least one stiffener 400 may be attached to the plate body. In some embodiments, a flow control plate 410 may be provided. The structure of the plate assembly 4000 and the plate settler assembly 100 are discussed below.

Referring to FIG. 4, the plate body 405 is depicted which when combined with other portions of the plate assembly 4000 and installed into a plate settler assembly creates a primary settling surface for the solids of the water being treated. In an example embodiment of a plate settler assembly, the plate bodies of two adjacent plate assemblies (such as the plate assembly 4000 shown in FIG. 4) within a plate settler assembly (such as the plate settler assembly 100 shown in FIG. 2) may be aligned in such a way that an inter-plate channel is created between each plate body (e.g., an example inter-plate channel may be bounded by the plate body and two attached support plates of one plate assembly in addition to a plate body of the adjacent plate assembly). These plate bodies may be parallel to one another (e.g., parallel within engineering and manufacturing tolerances) within the plate settler assembly 100. In some embodiments, the support plate(s) 420 may define the spacing between plate bodies 405 in a plate settler assembly.

The plate body 405 may be defined as a flat piece of material, such as stainless steel. In some embodiments, the plate body 405 may define a standard thickness (also referred to as a "gauge") corresponding to a sheet of stock material supplied by a metal foundry. The plate body thickness may be defined as the thickness between a first surface (e.g., the reverse side of the visible planar surface in FIG. 4) and a second surface (e.g., the planar surface visible in FIG. 4) of the plate body. In some embodiments, the plate body 405 may be rectangular.

The plate body may define a first end 450 and a second end 460. Additionally, a first lateral edge 470 and a second lateral edge 480 of the plate body 405 may be defined on axes perpendicular to the first end 450 or the second end 460 (e.g., perpendicular within engineering and manufacturing tolerances). In some instances, the second end 460 may correspond to the lowermost end in the basin in an installed position, and the first end 450 may correspond to the uppermost end in the basin in an installed position. For example, a flow control plate 410 may be attached to the plate body 405 at or proximate to the first end 450, a stiffener 400 may be attached to the plate body 405 at or proximate to the second end 460, and/or a central stiffener 510 may be attached to the plate body 405 at or proximate to the middle of the first end 450 and second end 460 of the plate body.

In some embodiments, the material used for the plate body may include 22 gauge to 28 gauge stainless steel sheets with the optimal plate thickness being the minimum thickness required to support the desired load parameters of the application. The thickness of the plate body may be determined by the application the plate assembly is being used. For example, a wastewater application may use a thicker plate body to withstand the amount of solids suspended in the water. In some embodiments, the plate body may be cut to a specific shape (e.g. 54.5 inches W by 117 inches L) without folding being necessary. In some embodiments, the plate body 405 may define a width corresponding to a width of a sheet of stock material (e.g., 54.5 inches) and may be cut to length from a roll of the stock material. The shape of the plate body 405 is therefore flat, which allows for easier transportation with a reduced possibility of damage during use (e.g., folded plate bodies are more prone to failure due to the folding). In some embodiments, the thickness of the plate body 405 may be reduced relative to a unitary plate assembly, while increasing or maintaining the supporting strength of the support plate(s). Since the plate body is the largest and most expensive component of the plate assembly, a reduction in the thickness of the plate body improves the cost effectiveness of the plate assembly. For example, in some embodiments, a unitary plate assembly (e.g., a plate assembly comprising one or more support plates and a plate body made from the same piece of folded material) may use 24 gauge steel, with a 26 gauge unitary plate body lacking sufficient structural rigidity to function. However, in separately assembled embodiments, the plate body 405 may use thinner material than 24 gauge steel while still retaining sufficient rigidity to operate in a water treatment system as described herein.

With continued reference to FIG. 4, the support plate(s) 420 are each a separate piece from the plate body 405. Having multiple, independent components allows the support plate(s) 420 to be a different thickness than the plate body 405. The support plate 420 may be a folded piece of material (e.g., folded by stamping), creating two or more legs (e.g., 600, 610, and 620 shown in FIGS. 6A and 6B), as discussed below. Alternatively, the support plate 420 may be two or more pieces of material attached together to form two or more legs, as discussed below. The fold of each support plate 420 may be along the length direction (e.g., folded along a longer axis of the plate shown as direction "L" in FIG. 4). In some embodiments, the support plate 420 may be designed to withstand a certain predetermined load including the weight of the plate itself, the weight of settled solids (e.g., settler solids may weigh around 30 lbs.), and the weight of other fluid and structural forces during operation (e.g., the weight of other plate assemblies in the plate settler assembly). The support plate may be a piece of sheet metal (e.g., stainless steel). In some embodiments, the support plate(s) may be made using from 20 gauge to 24 gauge steel. In an example embodiment, the support plate(s) may be made using 20 gauge to 22 gauge steel. For example, the support plate(s) may be made using 22 gauge steel. In an example embodiment, the support plate(s) may be made using 22 to 24 gauge steel. For example, the support plate(s) may be made using 24 gauge steel.

In some embodiments, each support plate 420 may be a folded piece of sheet metal. The support plate(s) 420 may be made out of the same material (e.g., stainless steel) as the plate body. In some embodiments, the support plate may be designed to withstand more stress than the plate body during operation and may support and stiffen the plate body by having a higher thickness than the plate body. In some embodiments, the folds in the support plate(s) 420 may further increase the support provided. In some embodiments, the support plate(s) 420 may have two folds, producing three surfaces, the upper surface (e.g., a first leg) may be used to attach the plate body to the support plate, the next surface (e.g., a second leg) may provide the correct spacing between plate bodies and creates the channel between stacked plates, the last surface (e.g., a third leg) sits on top of the plate assembly (e.g., plate body) below and seals the channel formed by stacking the plates. Additionally, as discussed below, the small surface area of the support plate relative to the plate body allows for a reduction in material costs when the support plate has a greater thickness than the plate body (e.g., a support plate may be 20 to 24 gauge, while the plate body may be 26 gauge and the total quantity of material is decreased relative to a 24 gauge plate body). As discussed in more detail below in reference to FIGS. 9A-10B, this reduction in material comes without weakening the individual plate assemblies or the plate settler system. The separately assembled support plate(s) allows for a reduction in the overall material used. For example, one embodiment of the plate assembly using a 26 gauge steel plate body instead of 24 gauge steel results in a 25% reduction in weight in the overall plate assembly.

In some embodiments, the support plate(s) 420 may be manufactured off-site and shipped independently of the plate body. Therefore, once both the support plates and the plate bodies are on-site, they may be attached using welding, riveting, or the like. In some embodiments, the support plate(s) 420 may be spot welded onto the plate body 405 either on site or prior to shipping. In an automatic welding machine, the plate body 405 may be held stationary with minimal handling while the support plate(s) 420 and/or additional structural components (e.g., flow control plate 410, central stiffener 510, or stiffener 400) are positioned and welded to the plate body. The support plate(s) 420 may be attached to the plate body 405 along an edge between the first end 450 and the second end 460 of the plate body. In some cases, the support plate(s) 420 may be attached off-site using riveting, welding, or the like. The mobility and manufacturing flexibility allowed by the present disclosure helps to streamline the manufacturing process.

Figures 6A, 6B:
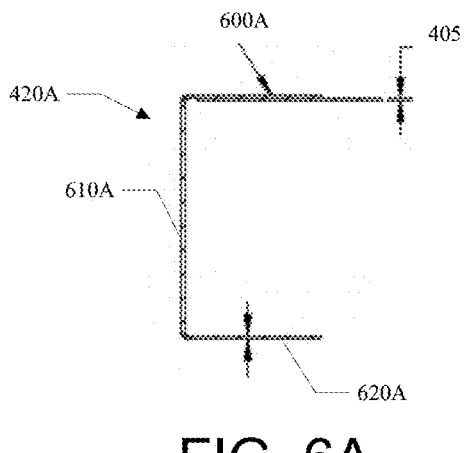
FIG. 6A is a sectional view of the connection between a first support plate and a plate body structured in accordance with one embodiment of the present disclosure.
FIG. 6B is a sectional view of the connection between a second support plate and a plate body structured in accordance with one embodiment of the present disclosure.

Referring now to FIGS. 6A and 6B, cross-sectional views of two support plates 420 are provided attached to a plate body 405 in accordance with example embodiments discussed herein. In the depicted embodiment, each support plate has a first leg 600A, 600B, a second leg 610A, 610B, and a third leg 620A, 620B, each generally perpendicular to adjacent legs to form a C-shape. In some embodiments, one or more support plates may have two legs (e.g., such as legs 600A and 610A in FIG. 6A). In some embodiments, such as the one shown in FIGS. 6A and 6B, the support plates may have three legs forming a C-shaped channel. The legs of each support plate 420 may be integrally formed (e.g., a piece of material folded to form the support plate), such as shown in FIGS. 6A and 6B. In some embodiments where the legs are integrally formed, the folding may be completed using a die on a press brake, which allows for an improvement in efficiency, accuracy, and reliability and a reduction in cost over the folding methods used in the unitary plate assemblies. Alternatively, the legs may be folded using roll forming, which may be very efficient but may have poorer part tolerances than die forming in some instances. In some embodiments, the plate support legs will all have a uniform thickness. In some embodiments, such as shown in FIGS. 6A and 6B, one leg of the support plate (e.g., leg 600A in FIG. 6A and leg 600B in FIG. 6B) may be attached to a surface of the plate body (e.g., the second surface of the plate body 405 as shown, or the first surface of the plate body 405, not shown). In the depicted embodiment, the legs 600A, 600B are attached to the upper, settling surface of the plate body 405. In some embodiments, the legs 600A, 600B may be attached to the lower, opposite surface of the plate body 405, such that the plate body 405 is disposed atop the support plates 420A, 420B relative to the orientation shown in FIGS. 6A-6B with the plate outside the channel formed by the support plates. In some embodiments, the lowermost legs (e.g., leg 620A of FIG. 6A and/or leg 620B of FIG. 6B) may contact a second, adjacent plate body to create the channel discussed herein.

The length of the support plate may be based on the length of the plate body. As such, in some embodiments, the support plate and the plate body may be the same length (e.g., the length may be 117 inches when the plate body has a length of 117 inches). In other embodiments, the support plate may have a different length than the plate body. In various embodiments, the size of the second leg 610A, 610B may be based on the desired size of the inter-plate channel and the force applied to the support plate. For example, the width of the second leg 610A, 610B may effectively be the distance between each plate body when the plate assemblies 4000 are placed into a plate settler assembly 100. Alternatively, spacers may be used to extend the size of the inter-plate channel. The width of the second leg 610A, 610B may be based on the water flow through the plate settler assembly and the desired flow rate to maximize sedimentation. In some embodiments, the majority of the load may be applied to the second leg 610A, 610B.

The first leg 600A, 600B and the third leg 620A, 620B, may have a width based on the load on the plate support. In an example embodiment of a plate settler assembly, each plate assembly may have a different second leg width. The different second leg widths may be based on the desired inter-plate channel size. In an example embodiment, the second legs of the support plates of a plate assembly in a plate settler assembly may have a width from 1.8 inches to 4 inches. For example, the second legs of the support plates of a plate assembly in a plate settler assembly may be from 1.8 inches to 3 inches. In other embodiments, the second legs of the support plates of a plate assembly in a plate settler assembly may have a width from 1.8 inches to 2 inches. For example, an example embodiment of a plate assembly may have a support plate with a second leg width of 1.8 inches. In other embodiments, the second legs of the support plates of a plate assembly in a plate settler assembly may have a width from 2 inches to 4 inches. For example, an example embodiment of a plate assembly may have a support plate with a second leg width of 3 inches. In other embodiments, the second legs of the support plates of a plate assembly in a plate settler assembly may have a width from 2 inches to 3 inches. In other embodiments, the second legs of the support plates of a plate assembly in a plate settler assembly may have a width from 3 inches to 4 inches. For example, an example embodiment of a plate assembly may have a support plate with a second leg width of 4 inches. In some embodiments, the first and third legs may be a uniform size (e.g. 1 inch). In other embodiments, the first and third legs may have different widths within a plate assembly and/or between plate settler assemblies. In some embodiments, the thickness of the support plate may be affected by the length of one or more legs. For example, the support plate thickness may be from 20 gauge to 24 gauge.

Figure 3:
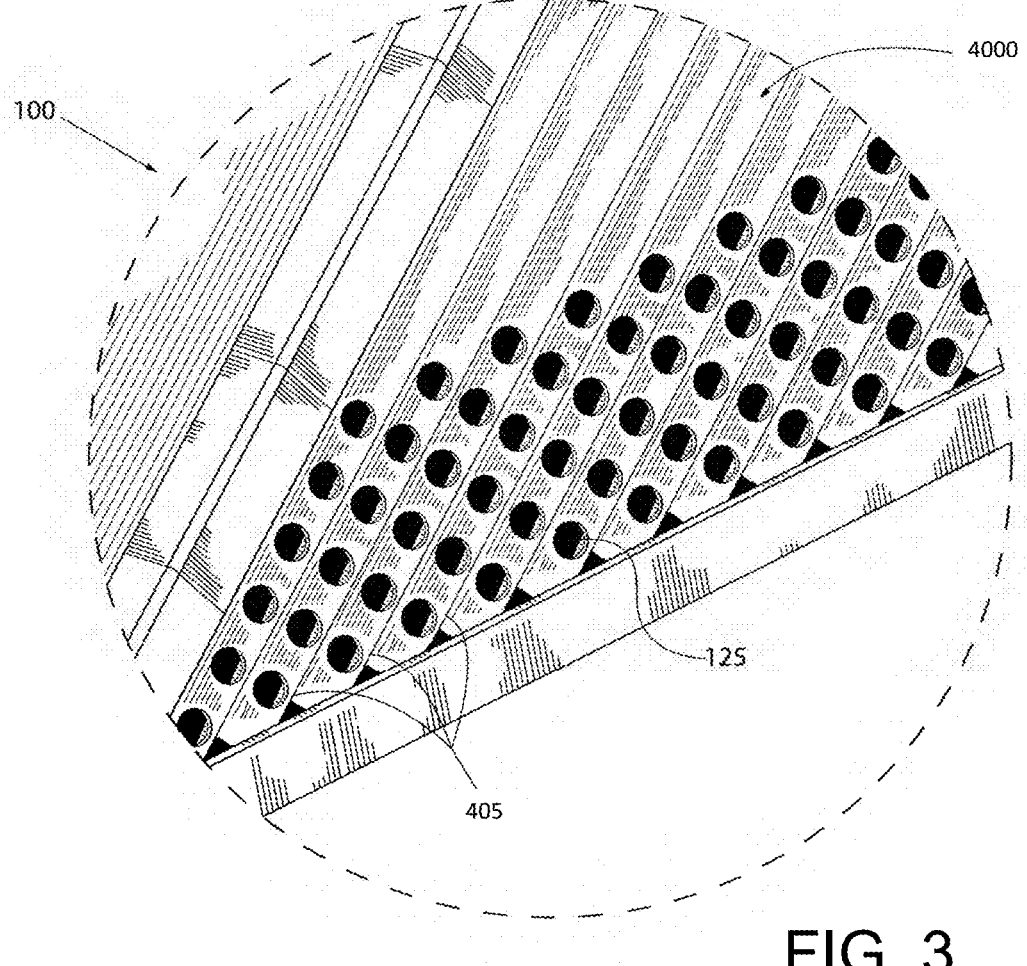
FIG. 3 is a detailed view of inlet ports positioned proximate the base of the plate settler assembly shown in FIG. 2, taken along detail circle 3.

With reference to FIG. 3, the support plate(s) 420 may have one or more inlet holes 125 to allow water to enter the inter-plate channel defined between plate bodies. In some embodiments the water may also enter the inter-plate channel from the bottom of the plate settler assembly. These inlet ports 125 may be defined in one or more of the support plates 420 proximate the second end 460 of the plate settler assembly. The amount and size of the inlet ports may be adjusted based on the desired flow rate of the water. In some embodiments, there may be 5 holes. In an example embodiment, the holes may be circular or oval. These holes may be equal sizes. In some embodiments, the holes are evenly spaced apart. In an example embodiment, the holes may be 3.375 inches apart from one another.

In some embodiments, as shown in FIGS. 4-5, a stiffener 400 may be provided along the edge at the second end 460 of the plate body 405. The stiffener 400 may be attached at or proximate the second end 460 of the plate body 405 and may be disposed parallel to the edge at the second end 460 of the plate body 405. A stiffener 400 may be used in the embodiments disclosed herein to provide additional support to the plate body 405 and plate settler assembly 100. In some embodiments, the stiffener 400 may be disposed on the opposite surface of the primary settling area of the plate body. This stiffener 400 may support the plate body 405 along a width axis of the plate body 405 (e.g., in the width (W) direction of the plate body).

As stated throughout, it was believed that a unitary plate assembly was the most efficient way to create a plate assembly, and in some embodiments, "hemming" (e.g., folding) the bottom of the plate body 405 one or more times may be used to create a structural support. In some embodiments discussed herein, a separate stiffener 400 may be welded to a separate plate body to provide more support for the plate body 405 than a hemmed bottom and to provide more flexibility and durability during the transportation and installation process. For example, a hemmed bottom is susceptible to permanent deformation and damage because a single crease (e.g., caused by loading the plate body) may cause the hem to lose structural integrity. A separately-attached stiffener may be made of thicker material (e.g., a stiffener may be made out of 16-18 gauge steel in some embodiments) and may be less likely to crease or otherwise permanently deform when welded to the plate body.

Figures 7A, 7B, 7C:
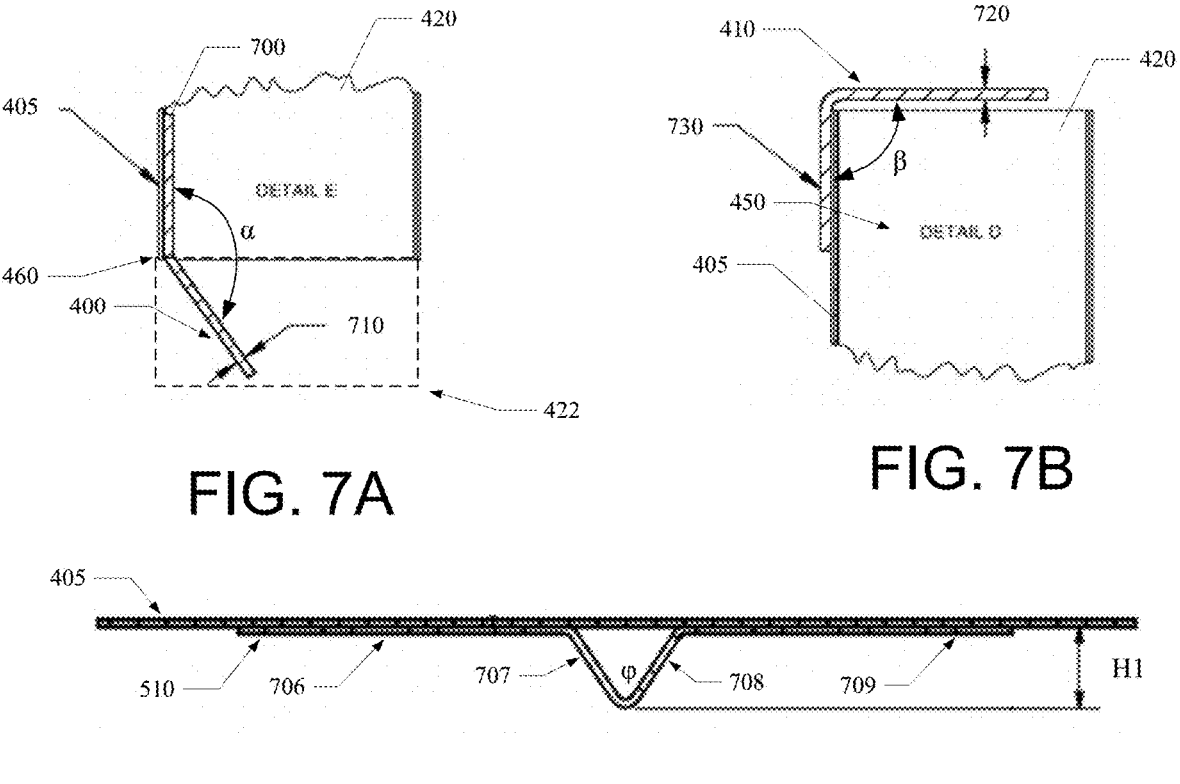
FIG. 7A is a sectional view, along the cutout E of FIG. 5, of the connection between a stiffener and a plate body structured in accordance with one embodiment of the present disclosure.
FIG. 7B is a sectional view, along the cutout D of FIG. 5, of the connection between a flow control plate and a plate body structured in accordance with one embodiment of the present disclosure.
FIG. 7C is a sectional view, along the cutout C of FIG. 5, of the connection between a central, supplemental stiffener and a plate body structured in accordance with one embodiment of the present disclosure.

Referring now to FIG. 7A, a close-up view of cutout E in FIG. 5, the stiffener may be a folded piece of material. In some embodiments, the stiffener may be a folded piece of sheet metal (e.g., stainless steel). The stiffener 400 may define a first leg 700 and a second leg 710. Each of the first leg 700 and the second leg 710 may have a length of 1 inch to 2 inches. In some embodiments, the first leg 700 and the second leg 710 may be the same length. For example, in a preferred embodiment, the legs 700, 710 may each have a length of 1 inch and the stiffener may be formed from 16 gauge stainless steel. Alternatively, the first leg 700 and the second leg 710 may have different lengths. In some embodiments, the width of the stiffener may be based on the width of the plate body 405 (e.g., the stiffener width may be equal to or less than the width of the plate body 405). The fold of the stiffener may be completed using a die on a press brake. Alternatively, the fold of the stiffener may be completed using roll forming. In various embodiments, the stiffener may be from 10 gauge to 20 gauge in thickness. In an example embodiment, the stiffener thickness may be 16 gauge. The thickness of the stiffener 400 may be greater than the thickness of the plate body 405. In some embodiments, the stiffener 400 may have a greater thickness than the support plate(s) 420. In some embodiments, the stiffener may be one piece of sheet metal doubled onto itself before being fold (e.g., a thinner sheet metal, such as 22 gauge, may be folded onto itself one or more times to create a thicker stiffener, in this example a doubled over 22 gauge sheet would be a similar thickness as a single 16 gauge sheet metal).

The stiffener 400 defines an angle α between the first leg 700 and second leg 710, which are either integrally formed or attached to one another. The angle α defined between the first leg 700 and the second leg 710 may be greater than 0 degrees and less than 180 degrees. In some embodiments, the angle defined between the first and the second leg is greater than 90 degrees. In some embodiments, the angle α between the first leg and the second leg may be at or approximately 145 degrees. In some embodiments, the angle α between the first leg and the second leg may be at or approximately 135 degrees. In some embodiments, the angle of the stiffener may correspond to the angle of the plate body 405 when placed into the final plate settler assembly 100, such that the second leg 710 points directly downward during use. The angle may be based on the desired rigidity of the stiffener (e.g., a smaller angle may provide more rigidity), and/or may be based on the flow characteristics through the inter-plate channels. The length of the stiffener 400 (e.g., the longitudinal dimension of the stiffener along the widthwise axis of the plate body) may be equal to or less than the width (W) of the plate body 405. In some embodiments, the length of the stiffener may be determined by the width of the plate body 405 (e.g., the stiffener may be 54.5 inches long when the plate body is 54.5 inches wide). In some embodiments, the stiffener 400 may be shorter than the width (W) of the plate body (e.g., the stiffener may only be provided along the middle of the plate body). In some embodiments, the stiffener 400 may be attached to the plate body 405 (e.g., attached through welding, riveting, or the like). In some embodiments, the stiffener 400 may be attached to the plate body 405 via an automatic welding machine as described herein. In some embodiments, the stiffener 400 may be attached to an opposite surface of the plate body 405 from the support plate(s) 420 to avoid interference between the components. In a preferred embodiment, the stiffener 400 may be attached to a surface opposite the settling surface of the plate body. In some embodiments, the stiffener may be formed from the primary plate body 405 (e.g., folded from the second end 460). FIG. 7A shows an optional broken line 422 indicating that the second end 460 of the support plates 420 may terminate short of, at, or past the stiffener 400 or the bend in the stiffener may be disposed at the second end in accordance with various embodiments (e.g., the stiffener may be positioned in various locations relative to the end of the support plates). As shown by the broken line 422, in some embodiments, the support plate(s) 420 may optionally extend to either end or beyond the second leg 710 of the stiffener 400. The first leg 700 of the stiffener 400 may be attached higher on the plate body 405, such that the support plate(s) 420 extends beyond the second leg 710 of the stiffener 400.

In various embodiments, the support plate 420, the stiffener 400, and the plate body 405 may be spot welded together on each end of the stiffener 400 (e.g., in the corners of the plate assembly). For example, the plate body 405 may be sandwiched between the support plate 420 on top and the stiffener 400 on the bottom at each end of the stiffener 400. The stiffener 400 may define a length equal to the width of the plate body 405 such that the stiffener 400 contacts or is disposed adjacent the support plates 420 at either end.

As shown in FIG. 5, a flow control plate 410 may also be provided along the edge of the first end 450 of the plate body. The flow control plate 410 may define, in combination with the flow control plates of other plate assemblies, a headloss control gap. The flow control plate may be a folded piece of sheet metal (e.g., stainless steel). In a preferred embodiment, the flow control plate 410 may be made out of at least 14 gauge steel. In some embodiments, the flow control plate 410 may be made out of steel thicker than 14 gauge steel. The flow control plate 410 may be the thickest component in the plate assembly 4000. In some embodiments, the flow control plate 410 may be used to support the weight of walking while the plate assemblies are being cleaned. The flow control plate 410 may be used to stiffen the first end 450 and support the plate body within the frame assembly. Additionally, the flow control plate 410 may function as a flow restriction to ensure even flow through the entire plate settler assembly.

Referring now to FIG. 7B, a close-up view of cutout D of FIG. 5, the flow control plate 410 may have a first leg 730 and a second leg 720. The flow control plate may be one integrally formed member (e.g., one piece folded) or multiple pieces (e.g., two pieces welded together). The first leg 730 and second leg 720 are oriented at an angle β relative to each other. This angle may be between 0 degrees and 180 degrees (e.g., the angle β may be approximately 90 degrees, such as shown in FIG. 7B). The width of the second leg of the flow control plate may be less than the width of the second leg of the support plate, which defines an opening between the flow control plate and the adjacent plate assembly. The opening allows for water to pass through the opening and transfer between different plate assemblies in the plate settler assemblies.

In some embodiments, the length of the flow control plate 410 may approximately the same as the width of the plate body 405. In such an embodiment. the support plate 420, the flow control plate 410, and the plate body 405 may be spot welded together at each end of the flow control plate 410. For example, in the depicted embodiment of FIG. 7B, at either end of the flow control plate 410, the support plate 420 may be sandwiched between the first leg 730 of the flow control plate 410 on top and the main plate 405 on the bottom. In such an arrangement, the flow control plate 410 and the plate body 405 may be attached (e.g., spot welded together) along the flow control plate 410 at locations where the support plate does not extend (e.g., greater than the width of the first leg 600A, 600B of the support plate 420 inward of the outer edges), such that the plate body 405 may flex at least slightly upwardly to weld to the flow control plate 410 in an instance in which the support plates 420 are sandwiched between the flow control plate 410 and the plate body 405 at each end of the flow control plate 410.

In some embodiments, the plate assembly 4000 may include the plate body 405 and at least one support plate(s) 420. In some embodiments, the stiffener 400 may also be attached to the plate body 405. In some embodiments, a flow control plate 410 may also be attached to the plate body 405. In some embodiments, for example, as shown in FIG. 4, the plate assembly 4000 may include the plate body 405, two support plates 420 disposed along opposite lateral edges 470, 480 of the plate body 405, an flow control plate 410 disposed along a first end 450 of the plate body 405, a central stiffener 510 disposed between the first end 450 and the second end 460 of the plate body 405, and/or a stiffener 400 disposed along a second end 460 of the plate body 405.

In some embodiments, the support plate(s) 420 may have a greater thickness than the plate body 405. In some embodiments using a stiffener 400, the stiffener 400 may have a greater thickness than the plate body 405. In some embodiments using a stiffener 400, the stiffener 400 may have a greater thickness than the plate body 405 and the support plate(s) 420. In some embodiments, the stiffener 400 may be thicker than each support plate(s) 420, and each support plate(s) 420 may be thicker than the plate body 405. In some embodiments using a flow control plate 410, the flow control plate 410 may be thicker than the stiffener 400, the plate body 405, and/or the support plate(s). For example, the plate body 405 may be made using 26 gauge sheet metal, while the support plate(s) 420 may be made using 24 gauge sheet metal. In some embodiments, the plate body 405 may be enabled to be less than 24 gauge (e.g., thinner than 24 gauge) by the embodiments and components described herein. In some embodiments, the plate body 405 may be 26 gauge or thinner. In some embodiments, the plate body 405 may be 28 gauge or thinner. In some embodiments, a central stiffener 510 may be thicker than the plate body 405 and the support plate(s). In some embodiments, the central stiffener 510 may be the same thickness as the stiffener 400. In some embodiments, the central stiffener 510 may be thinner than the stiffener 400 and thicker than the plate body (e.g., a 22-24 gauge central stiffener, a 16-18 gauge stiffener, and a 26-28 gauge plate body). In some embodiments, a central stiffener 510 may be used in wastewater applications in which the potential loading may be greater than other applications. In some embodiments, one or more of the stiffener 400, the central stiffener 510, the support plate(s) 420, and the flow control plate 410 (in each case, if used in the particular embodiment) may be thicker than a unitary plate assembly plate, and the plate body 405 may be thinner than a unitary plate assembly plate, with comparably sufficient strength between the two embodiments.

In an example embodiment, such as the one shown in FIG. 4, where the plate assembly 4000 has a plate body 405, two support plates 420A, 420B, a flow control plate 410, and a stiffener 400, the plate body may be completely encircled by these components. In such a case, all buckling considerations that would be applied to the plate body in a unitary plate assembly, are transferred to the other components, such as the stiffener, in the separately assembled plate assembly. Such a configuration of the plate assembly 4000 allows the minimum thickness of the plate body 405 to be determined independent of the vertical load considerations and therefore the plate body only has to withstand the load due to gravity the settled solids during usage (e.g., the weight of the settled solids may be 30 lbs.). Since the other components, such as the support plate(s), the control flow plate, and/or the stiffener, encircle the plate body, the configuration may allow for a reduction in the thickness of the plate body relative to a unitary (e.g., folded) plate assembly. For example, in some embodiments, a unitary plate assembly (e.g., a plate assembly comprising one or more support plates and a plate body made from the same piece of folded material) may use 24 gauge steel, with a 26 gauge unitary plate body lacking sufficient structural rigidity to function. In separately assembled embodiments, such as those discussed herein, the plate body 405 may use thinner material than 24 gauge steel while still retaining sufficient rigidity to operate in a water treatment system as described herein. In some embodiments, the central stiffener 510 may provide lateral support thereby allowing a reduction in the required thickness of the plate body 405. The present inventors have discovered that this benefit may unexpectedly outweigh a perceived detriment that a separately assembled plate assembly would be prohibitively expensive and time consuming to manufacture, and that a thinner plate body does not necessarily cause a weaker plate assembly overall, as shown below.

Referring now to FIG. 7C, in some embodiments, a central stiffener 510 may be attached to a plate body 405 between the first end 450 and the second end 460 and substantially spanning a width of the plate body (e.g., the central stiffener 510 may be in the middle of the first end 450 and second end 460 of the plate body) in addition to, or instead of, the stiffener 400 attached at the second end of the plate body. In some embodiments, a central stiffener 510, such as the one shown in FIG. 7C may be positioned along the lengthwise center of the plate body 405 (e.g., parallel to at least one of the first end 450 or second end 460 at or proximate to a midpoint between ends). The central stiffener 510 may be attached (e.g., via spot welding) to the underside of the plate body 405 relative to an operational position of the plate. In some embodiments, the central stiffener 510 and the stiffener 400 may combine to provide additional structural support allowing further reduction in the plate body thickness (e.g., a 28 gauge plate or thinner). In some embodiments, as shown in FIG. 7C, the central stiffener 510 may have one or more legs. In some embodiments, the central stiffener 510 may be configured with a plurality of folds creating three or more legs (e.g., the central stiffener 510 may have three folds and four legs (706, 707, 708, and 709) as shown in FIG. 7C). In some embodiments, one or more of the legs may be attached to and parallel to the underside of the plate body 405 (e.g., FIG. 7C shows two legs 706, 709 being attached to underside of the plate body). For example, in the depicted embodiment, the center stiffener 510 may define two attachment legs 706, 709 configured to lie parallel to and engage (e.g., via welding) the plate body, with two stiffening legs 707, 708 forming a raised ridge between the attachment legs.

In some embodiments, one or more of the legs of the central stiffener (e.g., stiffening legs 707, 708) may not be parallel with the plate body 405 and said one or more legs may define an angle between the plate body and the respective leg of greater than 0 degrees and less than 90 degrees relative to the plate body (e.g., in the embodiment shown in FIG. 7C, both the second leg 707 and 708 extend from the plate body 405 facing each other at acute angles). In an example embodiment with two legs extending non-parallel with the plate body 405, the two legs may be attached to one another at a ridge. In such an embodiment, the two legs not parallel to the plate body may have an angle φ defined that may be greater than 0 degrees and less than 180 degrees. For example, the angle φ may be 67 degrees. The angle may be based on the desired rigidity of the central stiffener 510 (e.g., a smaller angle may provide more rigidity), and/or may be based on the flow characteristics through the inter-plate channels to minimize interference with the flow in the channel. The length of the central stiffener 510 (e.g., the longitudinal dimension of the central stiffener along the widthwise axis of the plate body) may be equal to or less than the width (W) of the plate body 405. In some embodiments, the length of the central stiffener 510 may be determined by the width of the plate body 405 (e.g., the central stiffener 510 may be 54.5 inches long when the plate body is 54.5 inches wide). In some embodiments, the central stiffener 510 may be shorter than the width (W) of the plate body (e.g., the central stiffener may only be provided along the middle of the plate body). In some embodiments, the central stiffener 510 may be attached to the plate body 405 (e.g., attached through welding, riveting, or the like). In some embodiments, the central stiffener 510 may be attached to the plate body 405 via an automatic welding machine as described herein.

In an example embodiment, the one or more legs not parallel to the plate body may extend a perpendicular distance (H) from the plate body. In some embodiments, the perpendicular distance H may be greater than 0 and substantially less than the second leg of the support plate(s) (e.g., shorter than the height of the channel). For example, the perpendicular distance H may be 0.25 inches. A larger perpendicular distance H increases the flow restriction in the channel caused by the central stiffener. In some embodiments, a central stiffener with a channel restriction area (e.g., the H times the length of the central stiffener) of less than 12% of the total channel flow area may allow for an increase in strength without substantially deteriorating the performance of the plate settler assembly.

The fold(s) of the central stiffener 510 may be completed using a die on a press brake. Alternatively, the fold(s) of the central stiffener 510 may be completed using roll forming. In various embodiments, the central stiffener 510 may be from 10 gauge to 24 gauge in thickness. In an example embodiment, the central stiffener 510 thickness may be 22-24 gauge. The thickness of the central stiffener 510 may be greater than the thickness of the plate body 405. In some embodiments, the central stiffener 510 may have a greater or equal thickness to the support plate(s) 420. In some embodiments, the central stiffener 510 may be one piece of sheet metal doubled onto itself before being folded (e.g., a thinner sheet metal may be folded onto itself one or more times to create a thicker center stiffener).

Referring now to FIG. 2, a plurality of individual plate assemblies 4000 may be grouped together to create a plate settler assembly 100. In an example embodiment, such as the one shown in FIG. 2, each plate assembly may be placed in a frame 110 at an angle γ relative to horizontal that may help to support the plate assemblies. In some embodiments, the width of the plate assembly may be ¹⁄₁₆ of an inch less than an internal width of the frame 110. The plate assemblies may rest against one another, as can be seen in more detail in FIG. 3, with the first and last plate assembly being supported by the corresponding end plates 460, 470. The number of plate assemblies in a plate settler assembly may be determined by the desired use of the plate settler assembly.

Example Test Data

With reference to FIGS. 9A-10B, test results comparing a unitary plate with an assembled plate of varying component thickness are shown. The unitary plate assembly (labeled with circles in the depicted plot) included a plate body, two support plates, and a hemmed edge at the bottom of the plate folded at an angle integrally formed out of a sheet of 24 gauge steel. The unitary plate assembly also had a 14 gauge flow control plate attached to the plate body.

The separately assembled plate assembly, made in accordance with an example embodiment of the present disclosure, had a plate body made from a sheet of 26 gauge steel, two support plates made from a sheet of 24 gauge steel attached to the plate body via spot welding, a flow control plate made out of 14 gauge steel attached to the plate body via spot welding, and a stiffener made from a sheet of 16 gauge steel also attached to the plate body via spot welding. The weight and cost of the separately assembled plate assembly were less than that of the unitary plate assembly.

Figure 9A:
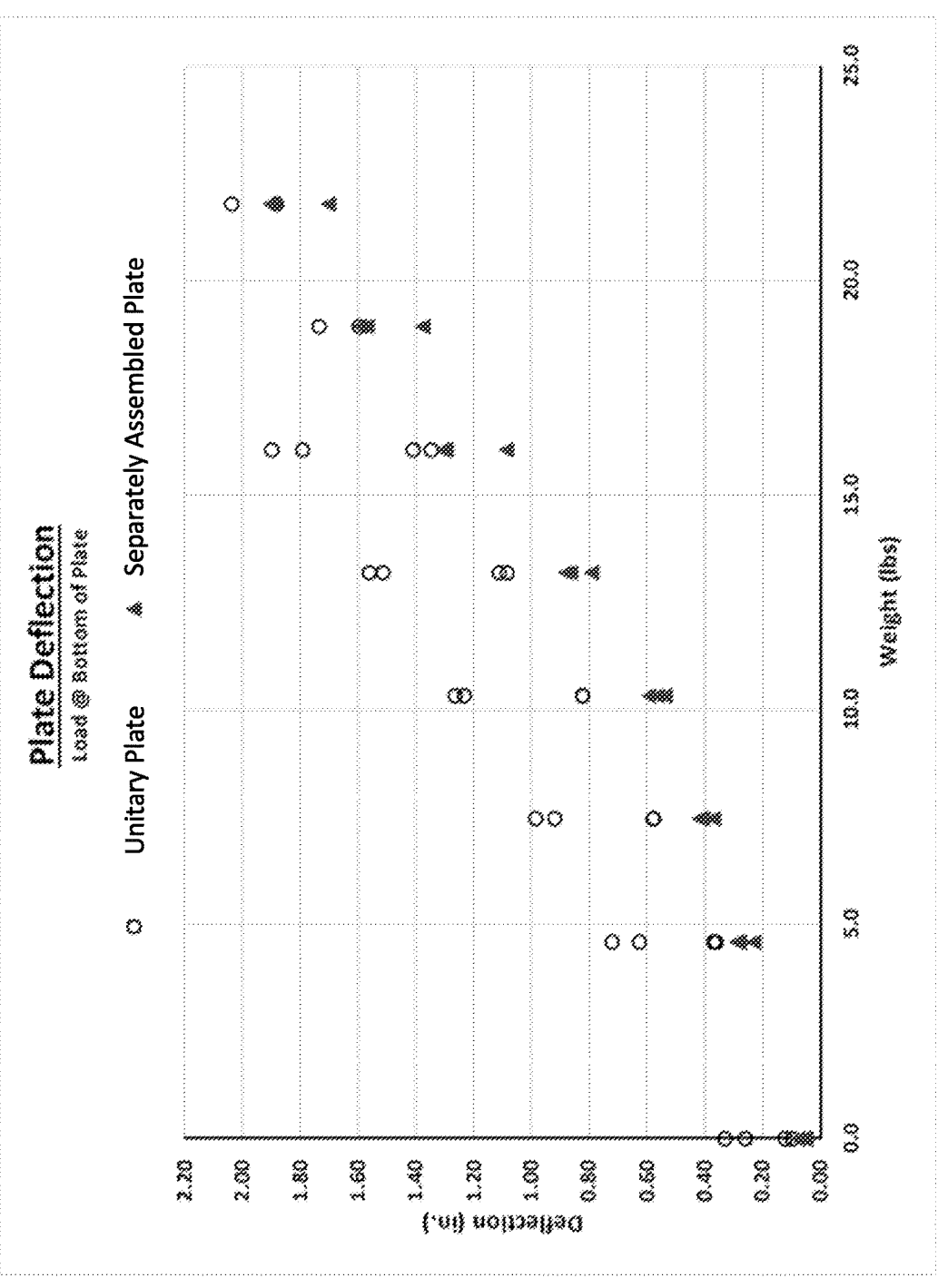
FIG. 9A is a graph showing the amount of deflection observed when various weights are placed on the bottom of plate assemblies in accordance with an example embodiment of the present disclosure compared to unitary plate assemblies.

As a part of the test, both plate assemblies were placed at a 55 degree angle (e.g., 55 degree incline relative to a horizontal plane) with the second end of the plate assembly comprising the stiffener being the lowermost end. A variable weight was provided at the widthwise center of the plate, with the load increasing over time. The deflection of each plate assembly was measured by a dial indicator at the center of each plate (center of length and width) and the bottom of each plate (center of the width and at the second end). The deflection at the bottom of each plate is shown in FIG. 9A. The deflection at the center of each plate is shown in FIG. 10A. During testing, the first point of failure was typically on the bottom portion of the plate assembly near the bottom end.

Referring now to FIG. 9A, the recorded deflection at the bottom of each plate assembly is shown as the load was increase from 0 to 25 pounds (lbs.). The separately assembled plate assemblies of the present disclosure are shown by the triangles, while the unitary plate assemblies are shown as the circles. Before any weight is applied, the separately assembled plate assemblies have less deflection, showing that the plate assemblies of the present disclosure deflect less than a unitary plate assembly, even before a weight is added. Additionally, as the load increases, the recorded deflections in the unitary plate assemblies are consistently and significantly higher than the recorded deflections of the separately assembled plate assembly.

Figure 9B:
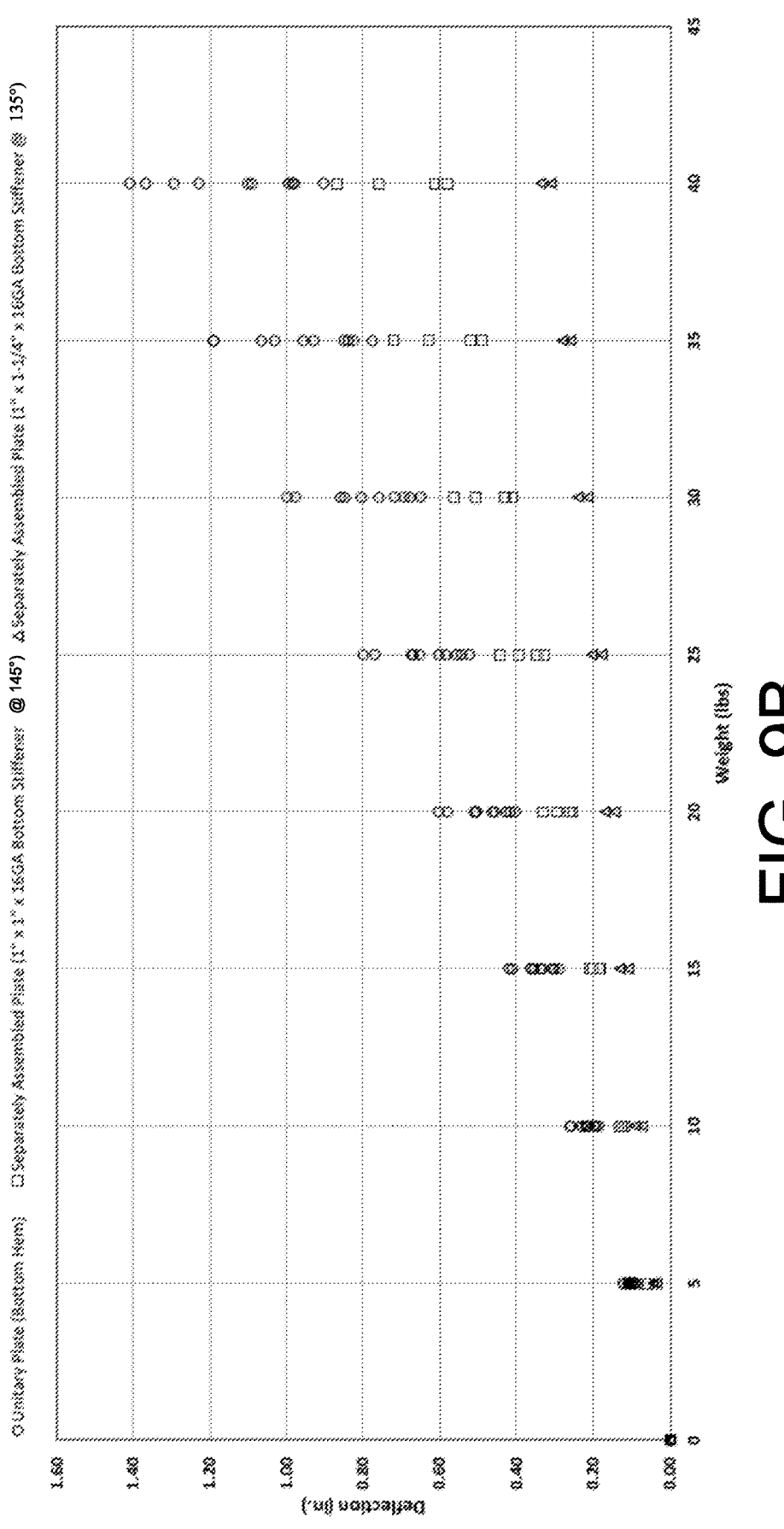
FIG. 9B is another graph showing the amount of deflection observed when various weights are placed on the bottom of plate assemblies in accordance with an example embodiment of the present disclosure compared to unitary plate assemblies.

Referring now to FIG. 9B, additional test results from another example illustrate the plate deflection of two example embodiments as compared to a unitary test embodiment. As shown, both the first separately assembled plate with a 16 gauge stiffener 400 with a first leg 700 length of 1 inch, a second leg length of 1 inch, and an alpha angle of 145 degrees (represented by the squares on the graph) and the second separately assembly plate with a 16 gauge stiffener 400 with a first leg 700 length of 1 inch, a second leg length of 1.25 inches, and an alpha angle of 135 (represented by the triangles on the chart) deflect less than the unitary plate assembly, particularly as the load increases from 0 to 40 lbs. As shown, the second separately assembled plate assembly deflects less than the first separately assembled plate assembly as the load is increased.

Referring now to FIG. 10A, the plate assemblies of the present disclosure perform equal to or better than the unitary plate assemblies when measured at the center of the plate, with the average deflection being in line with the unitary plate assembly as the load increase from 0 to 35 lbs. At the center of the plate, there is no supporting component provided to the plate body 405; however, the separately assembled plate assembly, even with a thinner plate body, has allowed for substantially the same deflection as the unitary embodiment and decreased deflection at higher loads. Referring now to FIG. 10B, another testing of the deflection at the center of the plate assemblies are shown with less deflection at the center of the separately assembled plate as the force is increased from 0 to 40 lbs. compared to the unitary plate assembly. As shown, as the load increases, the rate of deflection is less for the separately assembled plate assembly than the unitary plate assembly.
Method of Manufacture Referring now to FIG. 8, the operations of manufacturing a plate assembly 4000 according to an example embodiment are depicted. At block 800, a plate body 405 is provided with a defined first end 450 and second end 460 of the plate body. In accordance with some embodiments, the plate body also includes a first surface and a second surface which defines a thickness of the plate body. The plate body 405 may be a flat sheet of material, such as stainless steel as described herein. The size of the flat sheet may be based on the desired size of the plate assembly. In some cases, the plate body may be cut to a desired size. In other cases, the plate body may be a standard sheet metal size, which, in turn, reduces manufacturing costs.

Figure 8:
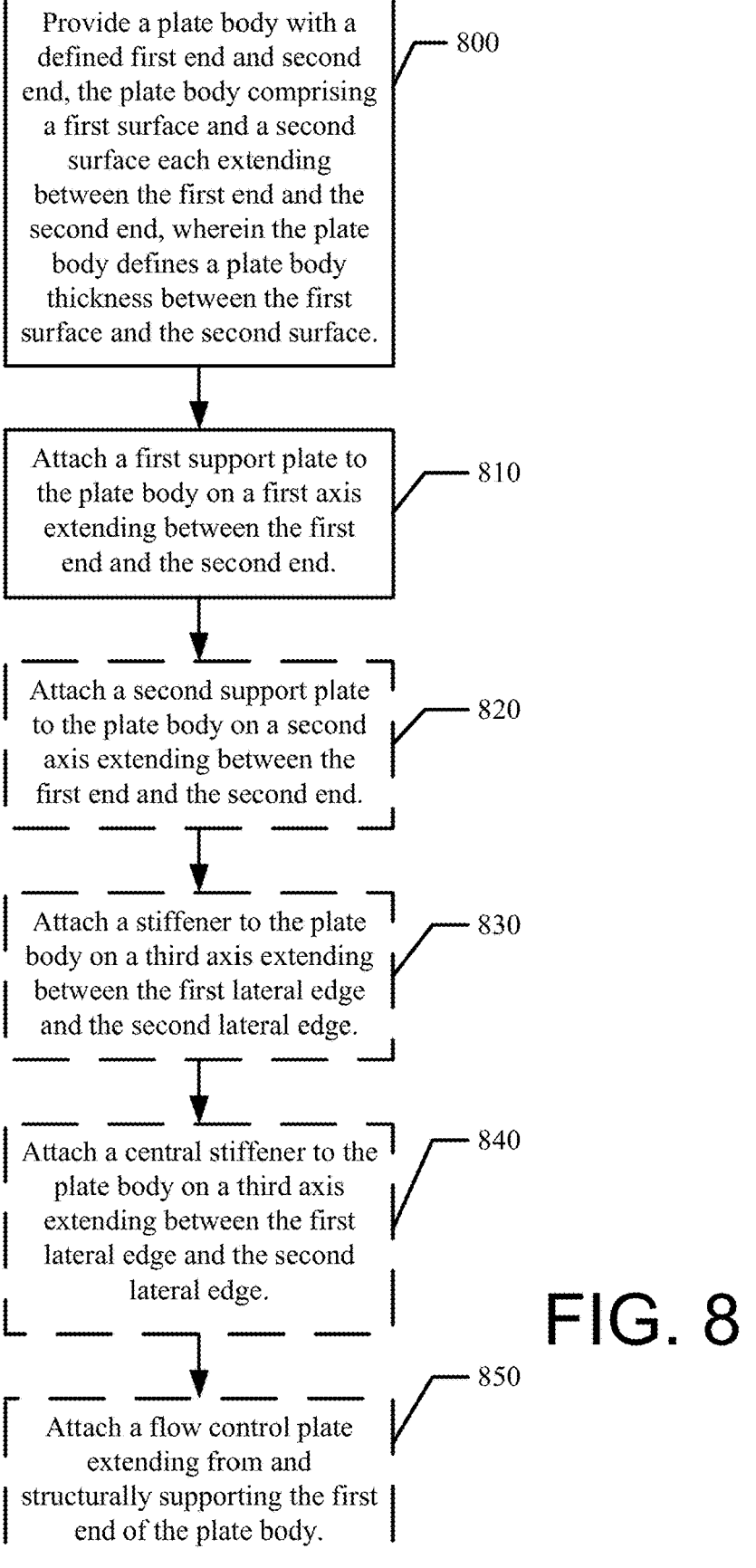
FIG. 8 is a flowchart illustrating the operations of manufacturing a plate assembly performed in accordance with an example embodiment of the present disclosure.

As shown in Block 810 of FIG. 8, a first support plate 420 is attached to the plate body 405 on a first axis extending between the first end 450 and the second end 460 of the plate body. The first support plate is attached along a first lateral edge 470 of the plate body between the first end 450 and the second end 460 of the plate body. In an example embodiment, the first leg of the support plate is attached to one surface of the plate body (e.g., the first surface or the second surface) along the first lateral edge 470. The attachment may be by welding, riveting, or other attachment methods. In an example embodiment, the support plate may be attached to the plate body using an automated spot welder. In some embodiments, the support plate may be attached by one of the attachment methods on-site where the plate assembly is to be installed. In such embodiments, the method may comprise transporting the components separately to the job site prior to installation.

As shown in optional Block 820 of FIG. 8, a second support plate 420 is attached to the plate body 405 on a second axis extending between the first end 450 and the second end 460 of the plate body. The second support plate may be attached along a second lateral edge 480 of the plate body between the first end 450 and the second end 460 of the plate body. The second support plate may be substantially perpendicular to the first end 450 and second end 460 of the plate body 405. The second support plate may also be substantially parallel with the first support plate. The second support plate (e.g., the second leg) may be attached to the same surface as the first support plate along the second lateral edge 480 of the plate body. The second support plate may be attached in substantially the same ways that the first support plate may be attached, as discussed above.

As shown in optional Block 830 of FIG. 8, a stiffener 400 is attached to the plate body 405 on a third axis extending between the first lateral edge 470 and the second lateral edge 480. The stiffener may be parallel to the first end 450 and the second end 460 of the plate body. In some embodiments, the stiffener may be attached along the second end 460 of the plate body. The stiffener may be attached by riveting, welding, or other attachment methods. In an example embodiment, the stiffener may be attached to the plate body using an automated spot welder. The stiffener may be positioned with a longitudinal dimension perpendicular to the first and the second support plates. The stiffener may be on the opposite surface of the plate body to the surface of the plate assembly that acts as the primary settling area (e.g., to avoid obstructing the collected solids from moving down and off of the primary settling assembly). In an example embodiment, the first leg 700 of the stiffener 400 may be attached to the plate body 405. Due to the angle α of the stiffener, the second leg 710 of the stiffener may also extend below the plate body. In such an example, the angle formed between the bottom of the plate body (or support plate) and the second leg may correspond to the desired angle, such as the angle γ shown in FIG. 2, of the plate settler assembly (e.g., so that the second leg is substantially perpendicular to the ground when placed into a plate settler assembly).

As shown in optional Block 840 of FIG. 8, a central stiffener 510 may be attached to the plate body 405 on the third axis extending between the first lateral edge 470 and the second lateral edge 480. In some embodiments, the central stiffener may be used in addition to the stiffener 400. The central stiffener 510 may be attached at or near the center between the first end 450 and the second end 460 of the plate body 405. The central stiffener 510 may be attached to the underside of the plate body 405. The central stiffener 510 may be attached by riveting, welding, or other attachment methods. In an example embodiment, the central stiffener 510 may be attached to the plate body using an automated spot welder. In some embodiments, the central stiffener 510 may be configured to obstruct as little flow of water as possible between the adjacent plate bodies. For example, the surface area of the central stiffener may define a cross-sectional area of 12% or less of the total channel cross-sectional area. In some embodiments, the central stiffener may comprise multiple legs attached to the plate body (e.g., as shown in FIG. 7C, the central stiffener may have two legs spot welded to the plate body). The central stiffener 510 may be folded from sheet metal (e.g., 22-24 gauge stainless steel sheet metal).

As shown in optional Block 850 of FIG. 8, a flow control plate 410 may be attached to the plate body 405 such that the flow control plate 410 extends from and structurally supports the first end 450 of the plate body 405. The flow control plate may be parallel to the first end 450 and the second end 460 of the plate body. The flow control plate may be attached along the first end 450 of the plate body. The flow control plate may be parallel to the stiffener in embodiments where both are provided. Additionally, the flow control plate may be perpendicular to the first support plate and the second support plate, if provided. The flow control plate may be attached, as shown in FIG. 7B, on the opposite surface of plate body that the stiffener is attached. In a preferred embodiment, the stiffener is attached to an underside of the plate body opposite the primary settling surface. The attachment of the flow control plate may be using riveting, welding, or other attachment methods. In some embodiments, the second leg 720 of the flow control plate may be substantially perpendicular to plate body (e.g., perpendicular within a typical engineering tolerances). In various embodiments, the flow control plate is positioned in a way that, when a plate assembly is placed into a plate settler assembly beside another plate assembly, water may be able to pass between the second leg of the flow control plate and the adjacent plate assembly. The exact size of the opening may be based on the desired flow rate of the plate settler assembly.

In some embodiments, the attachment method of all of the components above to the plate body may be the same (e.g., all components are welded to the plate body, such as by an automatic spot welder). In other embodiments, different components may use different attachment methods (e.g., the flow control plate may be riveted to the plate body, while the support plate(s) and the stiffener are welded to the plate body). Some components may be attached remotely and some may be attached on-site.

In some embodiments, the components described herein as a certain gauge or thickness may be made of multiple layers that collectively define the prescribed thickness. For example, a support plate having a gauge of 24 may actually be made of multiple, thinner sheets either folded from a single sheet or layered as separate sheets while still being considered a 24 gauge sheet. Similarly, although the support plate may be described as thicker than the plate body in some embodiments, the support plate may be made from a plurality of layers which individually are thinner than the plate body, but collectively are thicker than the plate body, without departing from the "thicker" description herein.

Associated Methods

Referring back to FIG. 2, plate assemblies 4000 may be placed together into a plate settler assembly 100. The multiple plate assemblies 4000 may each have a plate body 405 with a settling surface area, and the plate assemblies may be placed together at an angle γ for water to flow through and solids in the water to settle on the plates during the travel. The angle of installation for an example embodiment may be based on the desired flow rate of the water through the plate settler assembly. For example, in some embodiments the angle of installation may be between 40 degrees and 75 degrees. In an example embodiment, the angle of installation may be 55 degrees.

Referring back to FIG. 3, a close-up view of the plate settler assembly 100 of FIG. 2 is provided. In FIG. 3, the bottom portion of a group of example plate assemblies in the plate settler assembly are shown. In such an example, each plate assembly supports the one above it, while the plate assembly at the end is supported by the first end plate 460 and underlying frame structure. More generally, all of the plate assemblies are also supported by the frame 110, as shown in FIG. 2. The number of plate assemblies in a plate settler assembly depends on the desired amount of inter-plate channels for the water to be transported. In some embodiments, a greater number of inter-plate channels allows for more solids in the water to settle as there are more passes completed by the water traveling through the plate settler assembly. The individual plate settler assemblies may be placed in concert with other plate settler assemblies to allow for a larger amount of water may be treated.

As shown in FIG. 1, multiple plate settler assemblies may be placed together into a treatment basin 101, such as at a water treatment plant 1000. In some water treatment plants, there may be 10,000 plate assemblies or more configured in multiple plate settler assemblies. Example embodiments of the present disclosure would allow for significant reduction in material cost and labor cost (e.g., 25% reduction in materials per plate assembly) both on the individual plate assembly scale and on the large scale of water treatment plants. In some embodiments, the dimensions of each plate assembly, either length, width, or both, may remain the same (e.g., a standard size is 54.5 inch width by 117 inch length) and a reduction in material cost would result from the reduction in plate body thickness needed. For example, as discussed above, the plate assemblies of the present disclosure may be used as replacement plates for an existing water treatment system (e.g., the new plate assemblies may have the same dimensions along the length and width direction as an existing plate assembly, but with a thinner plate body).

Various embodiments of the components used in the present disclosure were described using thicknesses of metal. However, one skilled in the art would understand that different materials may be used for one or more components of an example embodiments. In such embodiments, the thickness of the material may be based on the relative strength of said material (e.g., an alternative material may be the thickness that would provide the same support as the thickness and material of a metal discussed herein).

In various embodiments, the plate assemblies 4000 of the present disclosure can be effectively used in any lamella clarifier applications. As described above, FIG. 8 illustrates a flowchart of the method of manufacturing the plate assembly 4000 according to an example embodiment of the present disclosure. As such, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A plate assembly for a plate settler, the plate assembly comprising:

a plate body defining a first end and a second end, the plate body comprising a first surface and a second surface each extending between the first end and the second end, wherein the plate body defines a plate body thickness between the first surface and the second surface; and a first support plate attached to the plate body on a first axis extending between the first end and the second end, wherein the first support plate is configured to support the plate body along at least a direction of the first axis, wherein the first support plate defines a first support plate thickness, the plate body and the first support plate being connected by a welded joint or by at least one fastener; and wherein the first support plate thickness is greater than the plate body thickness.

2. The plate assembly of claim 1, further comprising a second support plate attached to the plate body on a second axis extending between the first end and the second end, wherein the second support plate is configured to support the plate body along at least a direction of the second axis, wherein the second support plate defines a second support plate thickness, and wherein the second support plate thickness is greater than the plate body thickness.

3. The plate assembly of claim 2, wherein the first axis is parallel to the second axis.

4. The plate assembly of claim 2, wherein the plate body further defines a first lateral edge and a second lateral edge each extending between the first end and the second end, wherein the first support plate is attached to the plate body along the first lateral edge, and wherein the second support plate is attached to the plate body along the second lateral edge.

5. The plate assembly of claim 4, wherein the first support plate is attached to the second surface of the plate body along the first lateral edge, and wherein the second support plate is attached to the second surface of the plate body along the second lateral edge.

6. The plate assembly of claim 1, wherein the first support plate comprises a first leg and a second leg defining a first intersection therebetween, wherein the first intersection is disposed on the first axis, wherein the first leg comprises an attachment surface configured to attach to the plate body, and wherein the first leg is angled relative to the second leg, wherein the first support plate comprises a third leg and a second intersection between the second leg and the third leg, wherein the third leg is angled relative to the second leg, and wherein the first leg, the second leg, and the third leg of the first support plate are configured to define a C-shaped channel.

7. The plate assembly of claim 1, wherein the plate body defines a first lateral edge and a second lateral edge each extending between the first end and the second end, the plate assembly further comprising:

a stiffener attached to the plate body on a third axis extending between the first lateral edge and the second lateral edge, wherein the stiffener is configured to support the plate body along at least a direction of the third axis, wherein the stiffener defines a stiffener thickness; and wherein the stiffener thickness is greater than the plate body thickness.

8. The plate assembly of claim 7, wherein the stiffener thickness is greater than the first support plate thickness.

9. The plate assembly of claim 7, wherein the first axis is perpendicular to the third axis, wherein the stiffener comprises a first stiffener leg and a second stiffener leg defining a stiffener intersection therebetween, and wherein the stiffener intersection is disposed on the third axis, and wherein the first stiffener leg is disposed at an angle to the second stiffener leg.

10. The plate assembly of claim 1, further comprising a flow control plate extending from and structurally supporting the first end of the plate body, wherein the flow control plate defines a first lateral flow encouraging surface and a second lateral flow encouraging surface.

11. The plate assembly of claim 10, wherein the plate body defines a first lateral edge and a second lateral edge each extending between the first end and the second end, the plate assembly further comprising:

a stiffener attached to the plate body on a third axis extending between the first lateral edge and the second lateral edge, the stiffener being spaced from the first end and the flow control plate, wherein the stiffener is configured to support the plate body along at least a direction of the third axis, wherein the stiffener defines a stiffener thickness; and wherein the stiffener thickness is greater than the plate body thickness.

12. The plate assembly of claim 11, wherein the stiffener is disposed along the second end of the plate body; and wherein the flow control plate is thicker than the stiffener, the stiffener is thicker than the first support plate, and the first support plate is thicker than the plate body.

13. The plate assembly of claim 12, wherein the flow control plate is 14 gauge stainless steel, wherein the stiffener is from 16 to 18 gauge stainless steel, wherein the first support plate is from 22 to 24 gauge stainless steel, and wherein the plate body is 26 gauge or thinner stainless steel.

14. The plate assembly of claim 1, wherein the plate body and the first support plate is connected by the welded joint.

15. The plate assembly of claim 1, wherein the plate body defines a first lateral edge and a second lateral edge each extending between the first end and the second end, wherein the plate body defines a width of 54.5 inches between the first lateral edge and the second lateral edge.

16. A plate assembly for a plate settler, the plate assembly comprising:

a plate body defining a first end and a second end, the plate body comprising a first surface and a second surface each extending between the first end and the second end, wherein the plate body defines a plate body thickness between the first surface and the second surface, wherein the plate body defines a first lateral edge and a second lateral edge each extending between the first end and the second end;

a first support plate attached to the plate body on a first axis extending between the first end and the second end, wherein the first support plate is configured to support the plate body along at least a direction of the first axis, wherein the first support plate defines a first support plate thickness, wherein the first support plate thickness is greater than the plate body thickness; and a central stiffener attached to the plate body on a third axis extending between the first lateral edge and the second lateral edge, wherein the central stiffener is configured to support the plate body along at least a direction of the third axis, wherein the central stiffener defines a central stiffener thickness.

17. A plate assembly for a plate settler, the plate assembly comprising:

a plate body defining a first end and a second end, the plate body comprising a first surface and a second surface each extending between the first end and the second end; and a first support plate attached to the plate body on a first axis extending between the first end and the second end, wherein the first support plate is configured to support the plate body along at least a direction of the first axis, wherein the first support plate comprises:

a first leg and a second leg defining a first intersection therebetween, wherein the first intersection is disposed on the first axis, wherein the first leg comprises an attachment surface configured to attach to the plate body, and wherein the first leg is angled relative to the second leg; and a third leg and a second intersection between the second leg and the third leg, wherein the third leg is angled relative to the second leg; and a second support plate that comprises:

a first leg and a second leg defining a first intersection therebetween, wherein the first leg is angled relative to the second leg; and a third leg and a second intersection between the second leg and the third leg, wherein the third leg is angled relative to the second leg, wherein the first leg of the first support plate is positioned between the plate body and the third leg of the second support plate.

18. The plate assembly of claim 17, wherein the second leg of each of the first support plate and the second support plate have a width that is at least 1.8 inches and up to 4 inches.

19. The plate assembly of claim 17, wherein the plate assembly further comprises a welded joint between the plate body and the attachment surface of the first leg.

20. The plate assembly of claim 1, wherein the plate body and the first support plate is connected at least one rivet.

* * * * *